（12) United States Patent
Khoo et al.

(10) Patent No.: US 10,318,653 B1
(45) Date of Patent: Jun. 11, 2019

(54) SYSTEMS AND METHODS FOR CREATING HARNESS MODELS FOR MODEL VERIFICATION

(71) Applicant: The MathWorks, Inc., Natick, MA (US)

(72) Inventors: Yit Phang Khoo, Natick, MA (US); John P. Dirner, Roslindale, MA (US); S. M. Shahed Nejhum, Framingham, MA (US); Gregg P. Smith, Medfield, MA (US); Vijaya Raghavan, Brookline, MA (US); Kalyan Bemalkhedkar, Needham, MA (US); Krishna Balasubramanian, Wellesley, MA (US)

(73) Assignee: The MathWorks, Inc., Natick, MA (US)

( * ) Notice: Subject to any disclaimer, the term of this patent is extended or adjusted under 35 U.S.C. 154(b) by 484 days.

(21) Appl. No.: 14/632,722

(22) Filed: Feb. 26, 2015

(51) Int. Cl.
*G06F 17/50* (2006.01)

(52) U.S. Cl.
CPC .................... *G06F 17/50* (2013.01)

(58) Field of Classification Search
CPC .................. G06F 8/34; G06F 17/50
See application file for complete search history.

(56) References Cited

U.S. PATENT DOCUMENTS

| | | | | |
|---|---|---|---|---|
| 5,412,756 | A | * | 5/1995 | Bauman .................. G06N 5/043 706/45 |
| 6,505,342 | B1 | * | 1/2003 | Hartmann ............ G06F 11/3688 714/E11.208 |
| 7,424,410 | B2 | | 9/2008 | Orofino, II et al. |
| 7,434,183 | B2 | | 10/2008 | McGaughy et al. |
| 7,558,712 | B1 | | 7/2009 | Aldrich |
| 7,680,632 | B1 | | 3/2010 | Aldrich |

(Continued)

FOREIGN PATENT DOCUMENTS

WO   WO-2007/022289 A2   2/2007

OTHER PUBLICATIONS

Simulink® Design Verifier™ 1 User's Guide p. 1-485 (Year: 2010).*

(Continued)

*Primary Examiner* — Aniss Chad
*Assistant Examiner* — Chuen-Meei Gan
(74) *Attorney, Agent, or Firm* — Cesari and McKenna, LLP; Michael R. Reinemann

(57) ABSTRACT

Systems and methods automatically construct a harness model having a selected component from source model. The systems and methods determine an execution context of the component in the source model, and construct and configure the harness model to provide the same or an equivalent execution context in the harness model. Model elements may be added to the harness model, and the model elements may be configured to replicate the execution context. The harness model may be executed, and the operation of the component evaluated. Changes to the component are synchronized between the source model and the harness model, as are changes to the component's execution context. Assessment operations may be included in the harness model, and these assessment operations may be evaluated when the harness model is executed. A verification report that includes the results of the assessments may be generated.

34 Claims, 15 Drawing Sheets

(56) References Cited

U.S. PATENT DOCUMENTS

| | | | |
|---|---|---|---|
| 7,809,545 B2 | 10/2010 | Ciolfi et al. | |
| 7,912,692 B2 | 3/2011 | Matsushita | |
| 7,934,194 B2 | 4/2011 | Kinnucan, Jr. et al. | |
| 7,941,299 B1 | 5/2011 | Aldrich et al. | |
| 8,131,528 B1 | 3/2012 | Vora et al. | |
| 8,301,423 B1 | 10/2012 | Aldrich et al. | |
| 8,392,151 B1* | 3/2013 | Grace | G06T 19/00 345/473 |
| 8,402,006 B1 | 3/2013 | Bartlett | |
| 8,627,272 B1* | 1/2014 | Lin | G06F 8/10 717/104 |
| 8,666,709 B1 | 3/2014 | Aldrich et al. | |
| 8,812,276 B2 | 8/2014 | Aldrich et al. | |
| 8,972,931 B2 | 3/2015 | Pillarisetti | |
| 8,983,823 B1 | 3/2015 | Koh et al. | |
| 9,021,409 B2 | 4/2015 | Vasudevan | |
| 2003/0135476 A1* | 7/2003 | Holland | G06Q 10/04 706/47 |
| 2003/0167182 A1 | 9/2003 | Bloom et al. | |
| 2003/0236576 A1* | 12/2003 | Resnick | G05B 15/02 700/9 |
| 2005/0187717 A1* | 8/2005 | Paxson | G06F 19/12 702/19 |
| 2005/0193377 A1* | 9/2005 | Seto | G05B 17/02 717/136 |
| 2007/0100584 A1* | 5/2007 | August | G06Q 10/06 702/184 |
| 2007/0266366 A1 | 11/2007 | Bucuvalas | |
| 2007/0277151 A1* | 11/2007 | Brunel | G06F 8/31 717/113 |
| 2008/0092109 A1 | 4/2008 | Kinnucan, Jr. et al. | |
| 2008/0092111 A1 | 4/2008 | Kinnucan et al. | |
| 2008/0098349 A1* | 4/2008 | Lin | G06F 8/10 717/106 |
| 2008/0263506 A1 | 10/2008 | Broadfoot et al. | |
| 2009/0006062 A1 | 1/2009 | Sedukhin et al. | |
| 2009/0077511 A1 | 3/2009 | Wahler et al. | |
| 2009/0098349 A1 | 4/2009 | Ichikawa | |
| 2009/0234640 A1 | 9/2009 | Boegle et al. | |
| 2011/0283260 A1 | 11/2011 | Bucuvalas | |
| 2011/0295578 A1 | 12/2011 | Aldrich et al. | |
| 2012/0324420 A1* | 12/2012 | Collinson | G05B 17/02 717/105 |
| 2014/0122028 A1 | 5/2014 | Aberg | |
| 2014/0282227 A1* | 9/2014 | Nixon | G06F 17/5009 715/786 |
| 2014/0359566 A1 | 12/2014 | Avadhanula et al. | |
| 2014/0365190 A1* | 12/2014 | Mahate | G06F 17/5009 703/7 |

OTHER PUBLICATIONS

Simulink® Verification and Validation TM 2 User's Guide p. 1-829 (Year: 2010).*
Robert Reicherdt and Sabine Glesner, Slicing MATLAB Simulink Models, ICSE 2012, Zurich, Switzerland, p. 551-561 (Year: 2012).*
Mauro Mazzolini et al, Model-Checking based Verification Approach for Advanced Industrial Automation Solutions, IEEE, p. 1-8 (Year: 2010).*
Kai Hylla et al, Using SystemC for an extended MATLAB/Simulink verification flow, Forum on Specification and Design Languages 2008, p. 221-226 (Year: 2008).*
Denizhan Alparslan, Simulink Design Verifier 2.0 Product Presentation, 2011, p. 1-30 (Year: 2011).*
Shanker et al, Improving the Quality of Complex Control Logic Design using Model Verification, 2011, p. 1-24 (Year: 2011).*
Bringmann, Eckard, et al., "Model-based Testing of Automotive Systems," International Conference on Software Testing, Verification, and Validation, IEEE Computer Society, Apr. 9-11, 2008, pp. 485-493.
"MATRIXx™: Getting Started (Windows)," National Instruments Corporation, May 2003, pp. 1-75.
"Simulink Design Verifier User's Guide—R2012a," The MathWorks, Inc., Mar. 2012, pp. 1-515.
Antoulas et al., "A Survey of Model Reduction Methods for Large-Scale Systems", Contemporary Mathematics, Oct. 27, 2006, pp. 1-28.
Clarke, et al., "Model Checking and Abstraction", ACM Transactions on Programming Languages and Systems, vol. 16, No. 5, Sep. 1994, pp. 1512-1542.
Girard, et al., "Approximation Metrics for Discrete and Continuous Systems", Department of Computer & Information Science—Technical Reports (CIS), Jan. 2005, pp. 1-32.
Han, et al., "Detecting Data Store Access Conflict in Simulink by Solving Boolean Satisfiability Problems", In American Control Conference (ACC'10), Baltimore, MD, USA, Jun. 30-Jul. 2, 2010, pp. 1-6.
Han, et al., "Reachability Analysis of Hybrid Control Systems Using Reduced-Order Models", In IEEE Proceedings of American Control Conference (ACC'04), Jun. 30-Jul. 2, 2004, pp. 1183-1189.
Han, et al., "Reachability Analysis of Nonlinear Systems Using Trajectory Piecewise Linearized Models", IEEE, Proceedings of the 2006 American Control Conference, Minneapolis, Minnesota, USA, Jun. 14-16, 2006, pp. 1505-1510.
Heckel, Reiko, "Graph Transformation in a Nutshell" Electron Notes Theory of Computer Science, Feb. 2006, pp. 1-12.
Johnson, Richard, et al., "The Program Structure Tree: Computing Control Regions in Linear Time", In Proceedings of the ACM SIGPLAN 1994 Conference on Programming Language Design and Implementation, PLDI '94, Orlando, Florida, USA, Jun. 20-24,1994, pp. 171-185.
Fehnker, et al., "Hybrid System Verification is Not a Sinecure: The Electronic Throttle Control Case Study," ATVA 2004, LNCS vol. 3299, Springer-Verlag Berlin Heidelberg, 2004, pp. 263-277.
Kaga, et al., "Validation of Control Software Specification Using Design Interests Extraction and Model Checking", In SAE International, SAE 2012 World Congress and Exhibition, Apr. 24, 2012, pp. 1-13.
Matsubara, et al., "Model Checking with Program Slicing Based on Variable Dependence Graphs", In Workshop on Formal Techniques for Safety-Critical Systems, Nov. 2012, pp. 56-68.
"Notification of Transmittal of the International Search Report and the Written Opinion of the International Searching Authority, or the Declaration," International Filing Date: May 27, 2011, International Application No. PCT/US2011/000965, Applicant: The MathWorks, Inc., dated Oct. 6, 2011, pp. 1-10.
Pappas, "Bisimilar Linear Systems", Automatica, vol. 39, Jan. 2002, pp. 2035-2047.
Reicherdt, Robert, et al., "Slicing MATLAB Simulink Models," ICSE 2012, Proceedings of the 34th International Conference on Software Engineering, Zurich, Switzerland, IEEE, Jun. 2-9, 2012, pp. 551-561.
Rewienski, et al., "A Trajectory Piecewise-Linear Approach to Model Order Reduction and Fast Simulation of Nonlinear Circuits and Micromachined Devices", IEEE Transaction on Computer-Aided Design of Integrated Circuits and Systems, vol. 22, No. 2, Feb. 2003, pp. 155-170.
"Simulink® Designer Verifier 1: User's Guide", The MathWorks, Inc., May 2007, 485 pages.
"Simulink® Verification and Validation 2: User's Guide", The MathWorks, Inc., Sep. 2007, 829 pages.
TIP, "A Survey of Program Slicing Techniques", Journal of Programming Languages, vol. 3, 1995, pp. 1-65.
WEISER, "Program Slicing", IEEE Transactions on Software Engineering, vol. SE-10, No. 4, Jul. 1984, pp. 352-357.

* cited by examiner

SYSTEMS AND METHODS FOR CREATING HARNESS MODELS FOR MODEL VERIFICATION

BRIEF DESCRIPTION OF THE DRAWINGS

The invention description below refers to the accompanying drawings, of which.

DETAILED DESCRIPTION OF ILLUSTRATIVE EMBODIMENTS

Figure 1:
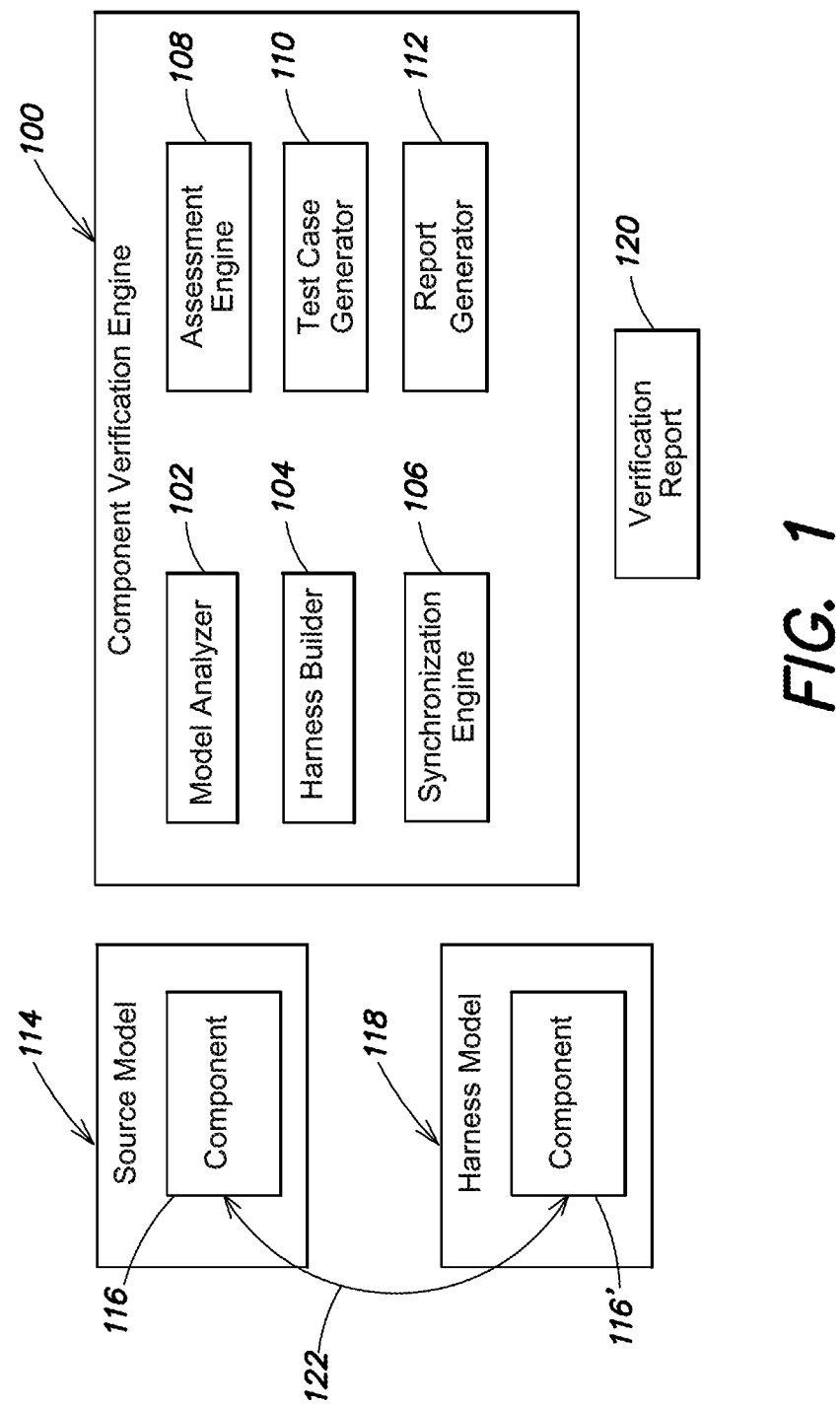
FIG. 1 is a schematic diagram of a component verification engine in accordance with an embodiment.

Computer-based modeling environments are often used to design systems, such as control systems, communications systems, factory automation systems, etc. A user may construct a computer model of a system being developed within a modeling environment. The model may include a plurality of model elements such as blocks, icons, states, objects, connections, etc. The model may have executable semantics, and be executed, e.g., simulated, by the modeling environment. During execution, the model processes input values and generates output values. A user may evaluate the generated output values to determine whether the model accurately mimics the system being designed.

To reduce model complexity and improve model organization, a group of model elements, such as blocks, may be organized into a single component of the model, such as a subsystem. The component may be represented within the model as a single element, such as a subsystem block. A component may itself include other components, thereby establishing multiple hierarchical levels within the model. Once created, a component may be saved in a library of the modeling environment for reuse.

The execution behavior of a component of a model may be context dependent. For example, at least some of the component's attributes, such as data types, data dimensions, sample times, solver, and parameters, may be left undefined. Particular settings or values for these attributes may be inherited by the component from the model. In addition, the elements of a component may not execute atomically. Instead, the execution of the elements of a component may be interleaved with the execution of other elements of the model.

During the development of a model, a user may be interested in evaluating one of the model's components, for example to determine whether it operates as intended or expected. The user may isolate the component by creating a copy of it, and placing the copy in a separate model. The user may then add one or more elements that feed input values to the component, and one or more elements that receive output values generated by the component. These additional elements may be referred to as a test harness, and the separate model may be referred to as a harness model. The user may then run the harness model to evaluate the operation of the component. Based on this evaluation, the user may choose to modify the copy of the component in the harness model. The user may then create a copy of the modified version of the component, and replace the component in the source model with the modified component copied from the harness model.

The copy of the component included in the harness model and evaluated by the user may not behave in the same manner as the component in the source model, e.g., because the execution behavior of components may be context dependent. That is, the copy of the component in the harness model may not provide an accurate representation of the behavior of the component in the source model. As a result, errors or other behavior of the component in the source model may not occur or may occur differently in the harness model, making the process of correcting or revising the component difficult.

Overview

Briefly, embodiments of the disclosure may include systems and methods for automatically, e.g., programmatically, constructing a harness model that includes a selected component from source model. The systems and methods determine the execution context of the component in the source model, and automatically construct and configure the harness model to replicate the component's execution context from the source model. The systems and methods may include a simulation engine and a component verification engine.

FIG. 1 is a schematic diagram of a component verification engine 100 according to an embodiment. The component verification engine 100 may include a model analyzer 102, a harness builder 104, a synchronization engine 106, an assessment engine 108, a test case generator 110, and a report generator 112. The model analyzer 102 may analyze a source model 114 that has a component 116, and determine the execution context of the component 116. For example, the model analyzer 102 may examine the elements making up the component 116, and may trace data and control paths leading to the component 116 to identify attributes of the component 116. The model analyzer 102 may also determine whether other variables or settings of the source model 114 affect the behavior of the component 116. In an embodiment, the simulation engine may compile at least a portion of the source model 114, and the model analyzer 102 may examine this compiled version to identify attributes of the selected component 116.

The harness builder 104 may automatically construct a harness model 118. In some embodiments, the harness builder 104 may include the same component 116 from the source model 114 in the harness model 118 as indicated by component 116', which may be linked to the component 116 in the source model 114. In addition, the harness builder 104 may configure the harness model 118 so that the attributes of the component 116', which were determined through the analysis of the source model 114, are recreated in the harness model 118, thereby replicating the component's execution behavior in the harness model 118.

For example, the harness builder 104 may select and include within the harness model 118 one or more source elements, one or more sink elements, and one or more data specification elements. The source elements may generate input data, such as test cases, for the component 116'. The sink elements may receive output data from the component 116' for storage, display, etc. The data specification elements may set one or more attributes of the input data generated by the source elements to replicate the attributes found in the source model 114. Workspace or other variables may be included or made available to the harness model 118 to replicate workspace or other variables utilized by the component 116 in the source model 114.

The assessment engine 108 may specify one or more assessments for the component 116', and include the specified assessments for the harness model 118. The assessments may check output or other values generated by the component 116' during execution of the harness model 118. At least some of the assessments may be derived from assessments specified in or with regard to the source model 114. For example, the assessments included in the harness model 118 may be derived from assessments appearing in the source model 114, such as assessments that relate to the selected component 116. Alternatively or additionally, the assessments included in the harness model 118 may be based on one or more specifications associated with the source model 114. Simulation of the harness model 118 may include evaluating these assessments to produce verification results, such as pass/fail indicators. The report generator 112 may produce a report 120 containing the verification results.

The assessments identified from the source model 114 may be presented to the user who may activate and/or deactivate particular assessments so that only those assessments that are of interest to the user are included or evaluated during execution of the harness model 118. In addition, new assessments may be defined and added to the harness model 118. The new assessments may be evaluated during execution of the harness model 118. One or more of the new assessments may be based on specifications created for the system being modeled.

The test case generator 110 may generate test cases for evaluation during execution by the harness model 118.

Based on the operation of the selected component 116' in the harness model 118, including the verification results, changes may be made to the component 116' to correct or improve its operation. The synchronization engine 106 may sync modifications to the component 116 entered in the source model 114 to the component 116' in the harness model 118. Similarly, the synchronization engine 106 may sync modifications to the component 116' entered in the harness model 118 to component 116 in the source model 114, as indicated by synchronization arrow 122. The synchronization engine 106 may have different modes of operation. For example, the synchronization engine 106 may sync changes between the source and harness models in real time, e.g., from the perspective of the user, when the harness model is opened or closed, or when a user command is received to perform synchronization. It should be understood that the synchronization engine 106 may operate in other modes.

In addition, the synchronization engine 106 may synchronize changes made to the source model 114 or to harness model 118 that alter the execution context of the component 116 and 116'. For example, workspace variables that are utilized by the component 116 may be synchronized between the source model 114 and the harness model 118. In addition, the source, sink, and data specification elements of the harness model 118 may also be modified based on changes made to the component 116 in the source model 114. For example, if a new input port is added to the component 116, the source and data specification elements of the harness model 118 may be changed to include new ports that correspond to the new port synchronously added to the component 116' in the harness model 118.

The harness model 118 may be saved with the source model 114. For example, the harness model 118 may be included in a project or other container that also includes the source model 114. Alternatively, the harness model 118 may be saved separately from the source model 114, such as in its own file and/or in its own project along with other harness models constructed for the component 116.

Modeling Environment

Figure 2:
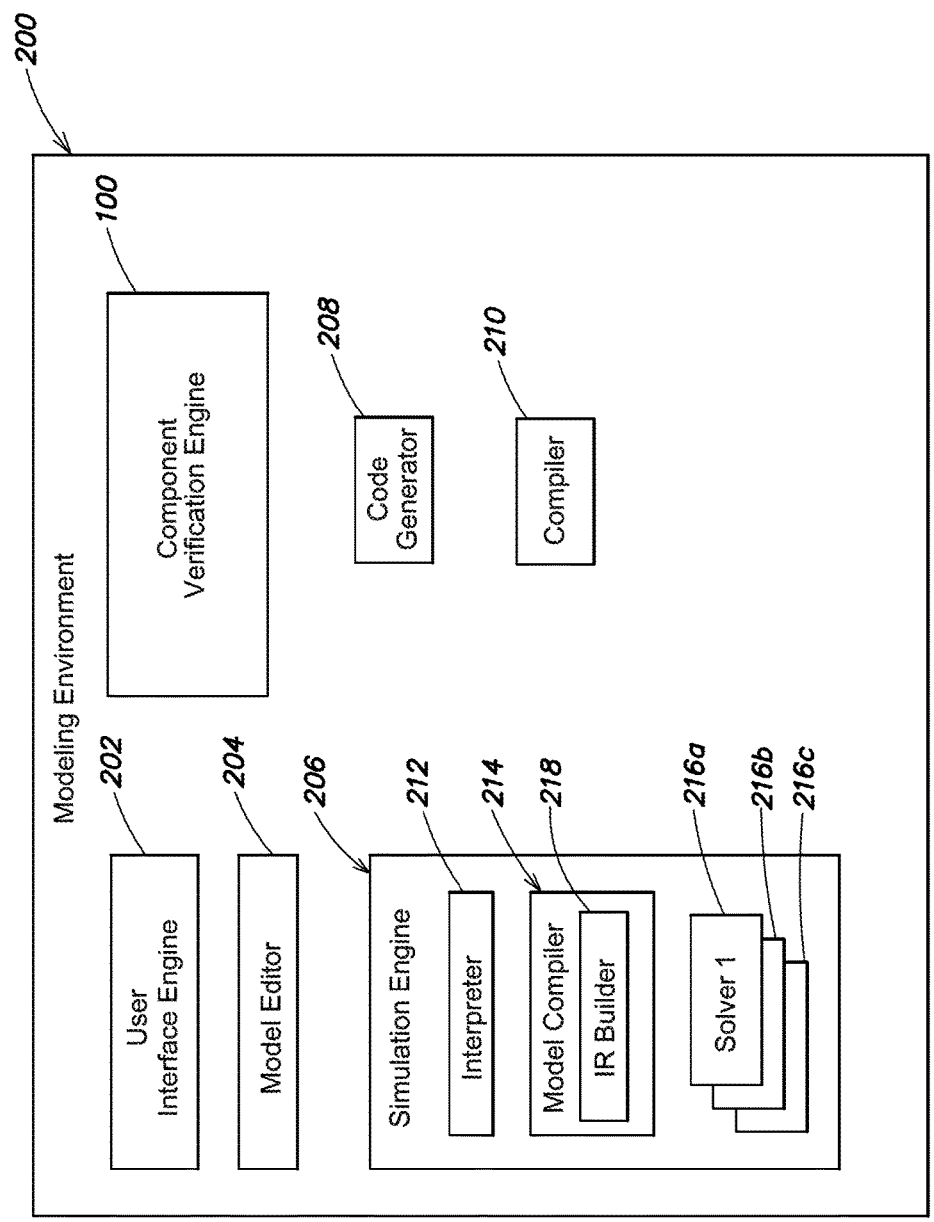
FIG. 2 is a schematic diagram of a modeling environment in accordance with an embodiment.

FIG. 2 is a schematic diagram of a modeling environment 200 in accordance with an embodiment. The modeling environment 200 may include a User Interface (UI) engine 202, a model editor 204, a simulation engine 206, the component verification engine 100, a code generator 208, and a compiler 210. The UI engine 202 may create and present one or more User Interfaces (UIs), such as Graphical User Interfaces (GUIs) and/or Command Line Interfaces (CLIs), on a display of a workstation or other data processing device. The UIs may be operated by a user to initiate various model-related tasks, such as opening, constructing, and saving models. The model editor 204 may perform selected operations, such as open, construct, edit, and save, in response to user inputs.

The simulation engine 206 may include an interpreter 212, a model compiler 214, and one or more solvers, such as solvers 216a-c. The model compiler 214 may include one or more Intermediate Representation (IR) builders, such as IR builder 218. The simulation engine 206 may execute, e.g., compile and run or interpret, computer-generated simulation models, created or opened by the user, using one or more of the solvers 216a-c. Exemplary solvers include one or more fixed-step continuous solvers, which may utilize integration techniques based on Euler's Method or Heun's Method, and one or more variable-step solvers, which may be based on the Runge-Kutta and Dormand-Prince pair. The code generator 208 may generate code for a model or portion thereof automatically, such as source or object code. For example, code generator 208 may generate code for the harness model 118, the source model 114, a component 116, a model element, etc. The generated code may be in form suitable for execution outside of the modeling environment 200, and may be referred to as standalone code. The compiler 210 may compile the generated source code for execution by a target computer platform The modeling environment 200 may include other modules, such as a differencing engine for comparing two models and identifying the differences between them, a merge engine for merging two models, etc.

In an embodiment, the component verification engine 100 and/or one or more of the parts thereof may be implemented through one or more software modules or libraries containing program instructions pertaining to the methods described herein. The software modules may be stored in a memory, such as a main memory, a persistent memory and/or a computer readable media, of a workstation, server, or other data processing machine or device, and executed by one or more processors. Other computer readable media may also be used to store and execute these program instructions, such as non-transitory computer readable media, including optical, magnetic, or magneto-optical media. In another embodiment, the component verification engine 100 and/or one or more of the parts thereof may comprise hardware registers and combinational logic configured and arranged to produce sequential logic circuits. In alternative embodiments, various combinations of software and hardware, including firmware, may be utilized to implement the described methods.

In some embodiments, the component verification engine 100 and/or one or more parts thereof may be separate from the modeling environment 200. In such cases, the component verification engine 100 may communicate with the modeling environment 200, e.g., through local procedure calls (LPCs), remote procedure calls (RPCs), an Application Programming Interface (API), or another communication or interface technology.

The modeling environment 200 may be a high-level modeling application program. Suitable high-level modeling application programs include the MATLAB® algorithm development environment and the Simulink® model-based design environment from The MathWorks, Inc. of Natick, Mass., as well as the Simscape physical modeling system and the Stateflow® state chart tool also from The MathWorks, Inc., the MapleSim physical modeling and simulation tool from Waterloo Maple Inc. of Waterloo, Ontario, Canada, the LabVIEW virtual instrument programming system and the NI MatrixX model-based design product from National Instruments Corp. of Austin, Tex., the Visual Engineering Environment (VEE) from Agilent Technologies, Inc. of Santa Clara, Calif., the System Studio model-based signal processing algorithm design and analysis tool and the SPW signal processing algorithm tool from Synopsys, Inc. of Mountain View, Calif., a Unified Modeling Language (UML) system, a Systems Modeling Language (SysML) system, and the System Generator system from Xilinx, Inc. of San Jose, Calif. Models created in the high-level modeling environment 200 may contain less implementation detail, and thus operate at a higher level than certain programming languages, such as the C, C++, C#, and SystemC programming languages.

Those skilled in the art will understand that the MATLAB algorithm development environment is a math-oriented, textual programming environment for digital signal processing (DSP) design, among other uses. The Simulink model-based design environment is a block diagram based design environment for modeling and simulating dynamic systems, among other uses. The MATLAB and Simulink environments provide a number of high-level features that facilitate algorithm development and exploration, and support model-based design, including dynamic typing, array-based operations, data type inferencing, sample time inferencing, and execution order inferencing, among others.

In some embodiments, a lower level programming language, such as the C, C++, C#, and SystemC, programming languages, among others, may be used to create one or more models.

Models constructed in the modeling environment 200 may include textual models, graphical models, and combinations of graphical and textual models. A model, when executed, may simulate, e.g., approximate the operation of, a system. Exemplary systems include weather systems, financial systems, plants, controllers for factory automation, engine control units (ECUs), anti-lock braking systems (ABS), flight controllers, communication systems, etc. Execution of a model by the modeling environment 200 may also be referred to as simulating or running the model.

The modeling environment 200 may implement a graphical programming language having a syntax and semantics, and models may be constructed according to the syntax and semantics defined by the modeling environment 200. In particular, at least some model elements may represent dynamic systems whose outputs are signals where a signal is a time varying quantity having a value at all points in time during execution of a model, for example at each simulation or time step of model execution. A signal may have a number of attributes, such as signal name, data type, numeric type, and dimensionality.

Figure 3:
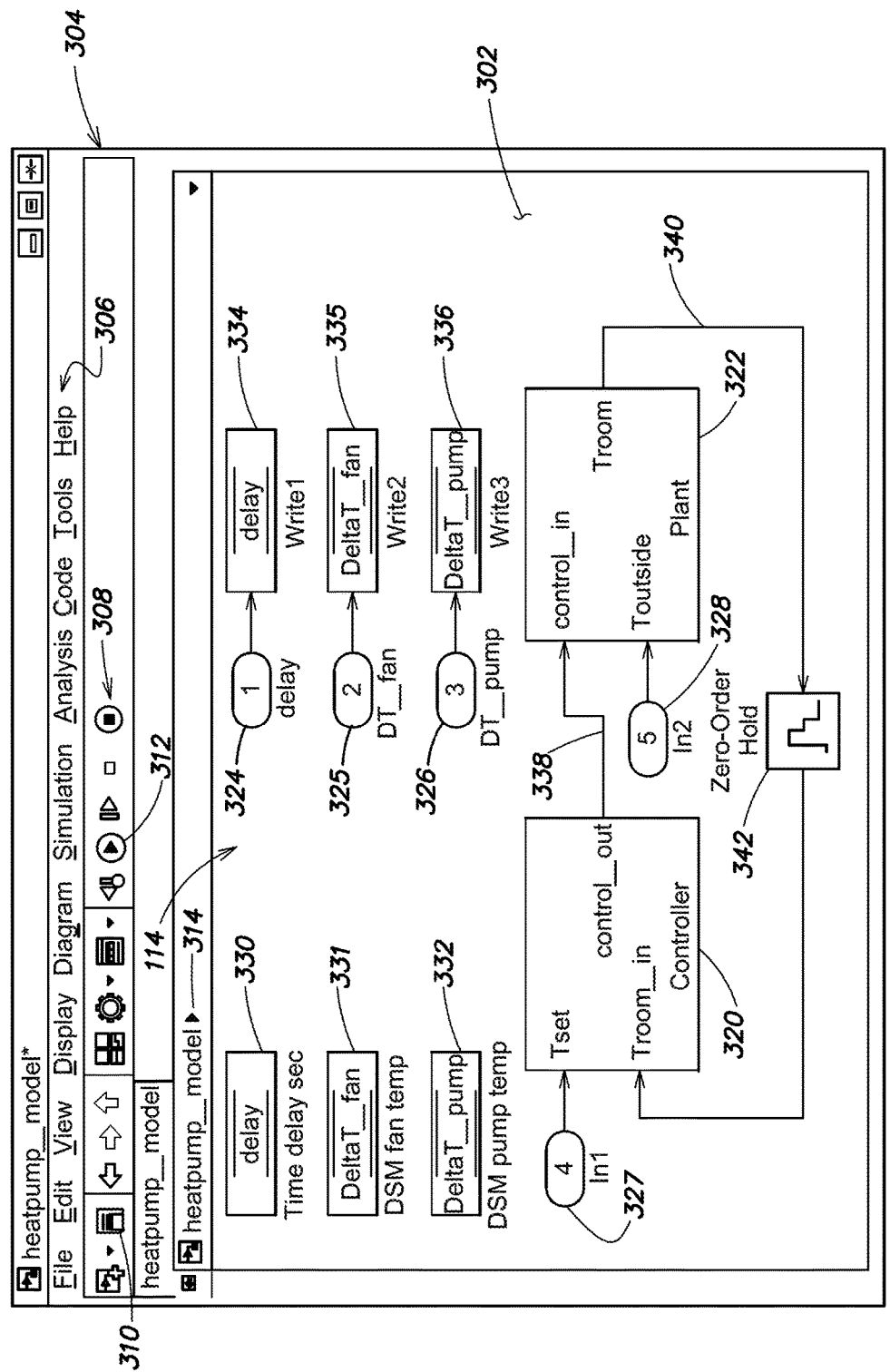
FIG. 3 is a schematic illustration of a source model in accordance with an embodiment.

FIG. 3 is a schematic illustration of the source model 114 in accordance with an embodiment. The model 114 may be presented on a canvas 302 of a model editor window 304. The model editor window 304 may be created by the UI engine 202 and presented on a display of a data processing device. The model editor window 304 may include graphical affordances allowing a user to construct, edit, revise, and run the model 114. In addition to the canvas 302, the model editor window 304 may include other graphical affordances or window elements (widgets), such as a menu bar 306 and a toolbar 308. The toolbar 308 may include a plurality of buttons representing commonly used commands, such as a Save button 310 and a Run button 312. In response to a user selecting the Run button 312, the simulation engine 206 may execute the model 114. The model editor window 304 also may include an explorer bar 314 providing a hierarchical list of components and referenced models included in the model 114.

Alternatively or additionally, the UI engine 202 may present one or more Command Line Interfaces (CLIs) and one or more text-based commands may be entered in the CLI, e.g., by a user, in order to run a model or to perform other operations.

The UI engine 202 may present a palette or library pane that lists various types of model elements, such as blocks, that may be selected and used to construct or revise a model. A user may select a desired block type from the palette or library pane, and cause the model editor 204 to add an instance of that block type to the canvas 302. The user also may cause the model editor 204 to establish relationships, such as connections, among the model elements. The connections may or may not be visually represented on the canvas 302. Blocks may represent dynamic systems, computations, functions, operations, data stores, events, states, state transitions, etc., and connections among blocks, which may appear as lines, arrows, etc., may represent data, control, signals, events, mathematical relationships, state transitions, physical connections, etc. In an embodiment, a group of model elements may be organized into a subsystem, and a group of states, state charts, and/or state transition tables may be organized into a subchart.

In an embodiment, model 114 may be a controller-plant model where the plant represents a combination air conditioner/heat pump controlled by a controller. Specifically, the model 114 may include a first subsystem 320 labeled 'Controller' and a second subsystem 322 labeled 'Plant'. The model 114 also may include first through fifth inport blocks 324-328 labeled 'delay', 'DT_fan', 'DT_pump', 'In1', and 'In2'. The model 114 may further include first through third data store memory blocks 330-332 labeled 'delay', 'DeltaT_fan', and 'DeltaT_pump' for defining and initializing shared data stores, whose values may be accessed by other model elements. The model 114 also includes first through third data store write blocks 334-336 that copy values from their inputs to respective data stores. In particular, the data store write blocks 334-336 copy values from the first, second, and third inport blocks 324-326 to the three data store memories 330-332.

The second subsystem 322 has two inputs: a control input labeled 'control_in', and an outside temperature input labeled 'Toutside'. The second subsystem 322 has one output labeled 'Troom', which represents the temperature of the room being heated or cooled. The first subsystem 320 has two inputs, a temperature set point labeled 'Tset', and a room temperature labeled 'Troom_in'. The 'control_out' signal of the first subsystem 320 is received by the second subsystem 322, as indicated by a connection arrow 338, and the output (Troom) of the second subsystem 322 is fed back to the first subsystem 320 as indicated by a feedback connection 340 through a zero order hold block 342 defined to hold its input for a specified time during model execution.

Based on the temperature setting and the room temperature input values, the controller subsystem 320 generates a control signal for the plant subsystem 322. The control signal may include a fan command, a pump command, and a pump direction, and these signals may be organized into a bus signal represented by the connection arrow 338. Based on the received control signal and the outside temperature signal, the plant subsystem 322 computes a room temperature value.

The controller subsystem 320 may include a state chart (not shown) that transitions between an Idle state and a Running state. In addition, the Running state may be a subchart that includes a 'Fan_Only' state, a 'Heating' state, and a 'Cooling' state.

The component verification engine 100 may create the harness model 118 programmatically or in response to user input. For example, the designated component may be identified by a user or identified programmatically. For example, a user may select, e.g., using a mouse or other pointer, the component 116 of the source model 114. Suppose the user selects the controller subsystem 320 as the component under test (CUT) 116. In response, the UI engine 202 may present a dialog having a plurality of commands or operations that are available for the selected component. The commands may include a 'Create Component Harness' command and a 'Create Testing Harness' command. The component verification engine 100 also may receive settings for one or more options for the verification process. These option settings may be specified by a user through one or more graphical affordances, such as windows, panes, dialogs, etc., that may be generated by the UI engine 202.

Figure 4:
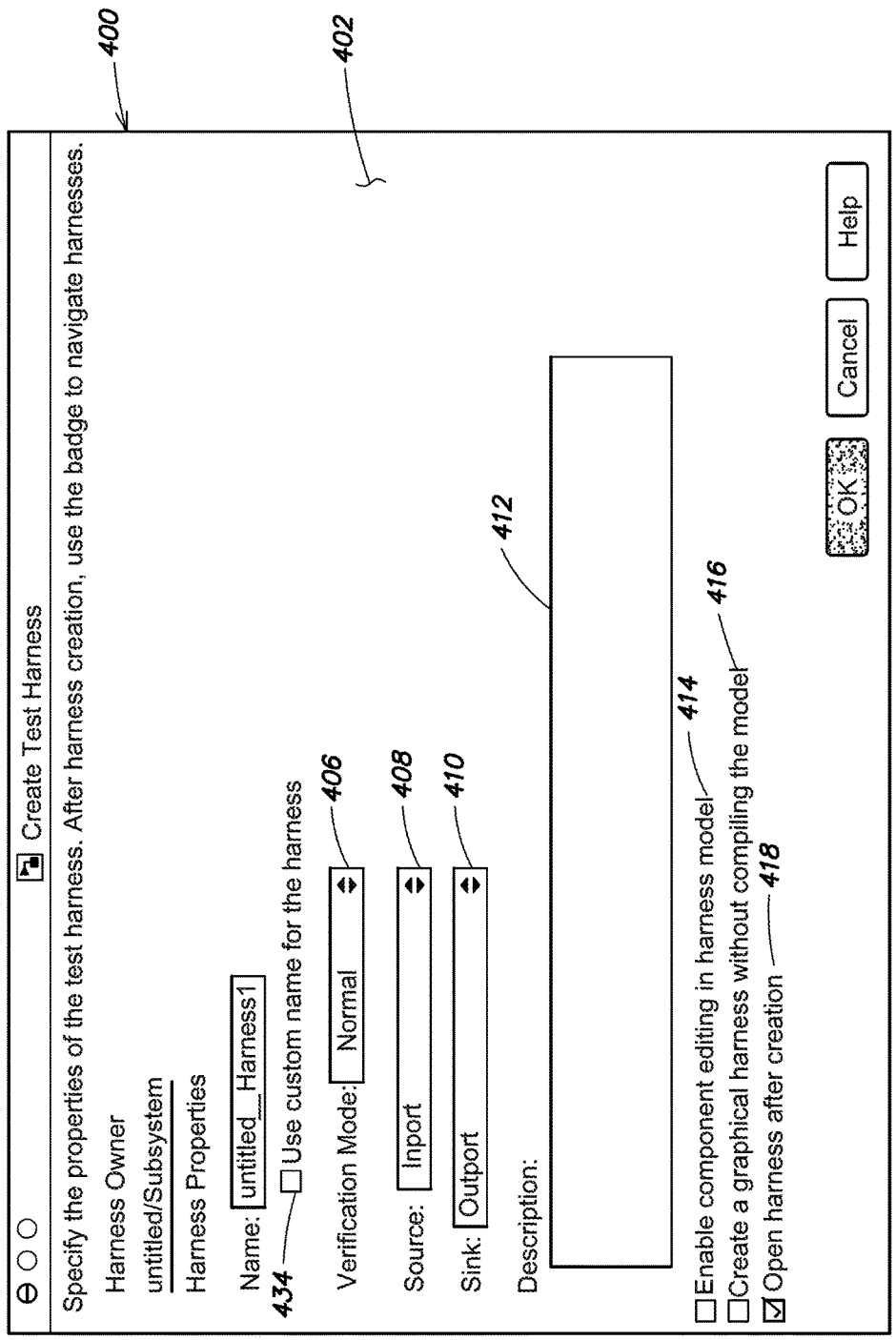
FIG. 4 is a schematic illustration of a dialog in accordance with an embodiment.

FIG. 4 is a schematic illustration of a dialog 400 for specifying option settings of a verification process in accordance with an embodiment. The dialog 400 may include a 'Name:' data entry box 402 for receiving a user-specified name for a harness model to be constructed, and a first checkbox 404 for indicating that a custom name is to be used. The dialog 400 also may include a 'Verification Mode:' drop down menu 406 through which a verification mode may be specified. The verification mode may determine how the selected component, also referred to as the component-under-test (CUT), will be represented in a harness model. Options include Normal, Software-in-the-Loop (SIL), and Processor-in-the-Loop (PIL). If Normal mode is selected, the CUT may be the same component as in the model 114 or it may be a clone of the component in the model 114. If SIL mode is selected, the CUT may be represented as a SIL block in the harness model. If PIL mode is selected, the CUT may be represented as a PIL block in the harness model. For SIL and PIL modes, code may be generated for the CUT, and the generated code may be compiled and executed for example on the same data processing device running the harness model, or on a separate data processing device, which may be remote from the device running the harness model. In some embodiments, SIL and PIL blocks may be implemented using subsystems or submodels. A SIL block may represent an interface to a software module that is separate from the source model. The software model and the source model may be executed by the same processor. A PIL block may represent an interface to a software model that is separate from the source model, and is run by a different processor than the one running the source model.

The dialog 400 also may include a 'Source:' drop down menu 408 to specify what kind of source elements should be included in the harness model to be constructed, and connected, at least initially, to one or more inputs of the CUT. Exemplary sources include Inport, Signal Builder, From Workspace, From File, None, and Custom. The dialog 400 may have a 'Sink:' drop down menu 410 to specify what kind of sink elements should be included within the harness model, and connected, at least initially, to one or more outputs of the CUT. Exemplary sinks are Outport, Scope, To Workspace, To File, None, and Custom. A 'Description:' data entry field 412 may be provided for receiving user-specified comments or notes regarding the harness model being constructed. Inport, Signal Builder, From Workspace, From File, Outport, Scope, To Workspace, and To File elements are blocks defined by the Simulink® model-based design environment.

In addition, the dialog 400 may include a second check box 414 for indicating whether the CUT should be locked or unlocked for editing within the harness model. A third checkbox 416 may indicate whether the harness model is to be automatically created without compiling the source model. A fourth checkbox 418 may indicate whether the harness model, upon creation, should be opened in a model editor window.

If the harness model is created without compiling the source model, the CUT may not have the same execution context in the harness model. For example, because the source model is not compiled, data attributes and workspace parameters of the CUT may be unknown. Accordingly, default data attributes and workspace parameters may be specified for the CUT in the harness model, and these default data attributes and workspace parameters may differ from the data attributes and workspace parameters specified in or by the source model. Similarly, to the extent data attributes and/or workspace parameters of the source model are changed, these changes may not be propagated to the CUT in the harness model. The creation of a harness model without compiling the source model may be selected when the source model is not yet complete, and thus cannot be compiled, where compilation of the source model is time-consuming, etc. While the CUT of the harness model may not have the same execution context, a user can nonetheless evaluate and experiment with the CUT. Furthermore, the CUT may still be kept in sync with the source model, such that changes to the CUT in the harness model may appear in the source model.

Figure 5A:
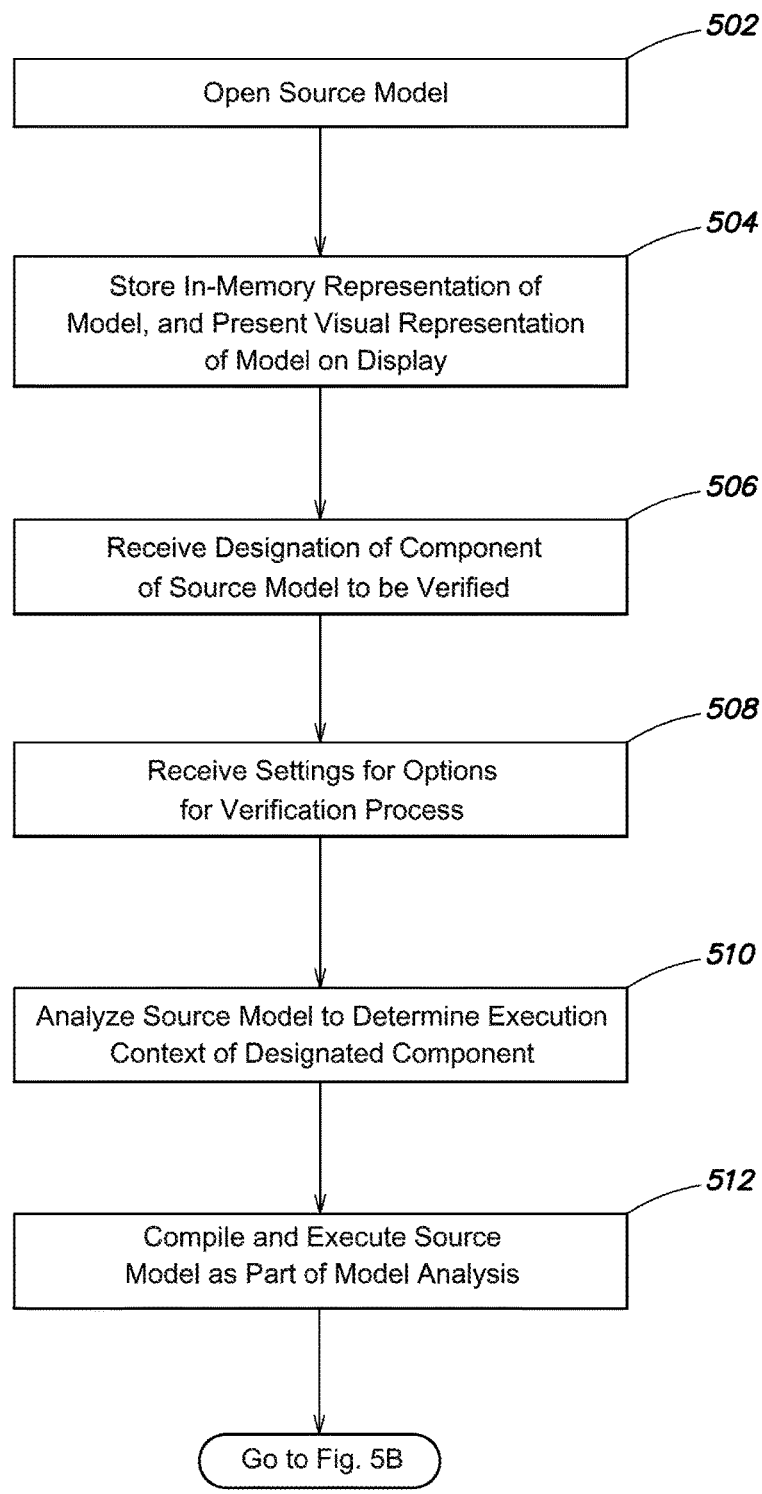
FIGS. 5A-B are partial views of a flow diagram of a method in accordance with an embodiment.
Figure 5B:
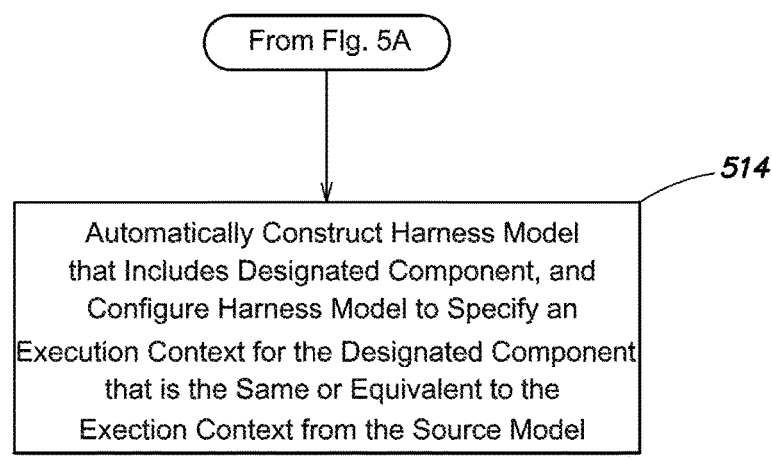

FIGS. 5A-B are partial views of a flow diagram of a method in accordance with an embodiment. The source model 114 may be opened or otherwise received by the modeling environment 200, as indicated at step 502. One or more in-memory representations of the source model 114 (or portion thereof), such as Intermediate Representations (IRs) may be created stored in a memory, while a visual representation of the model 114 may be displayed, e.g., on the canvas 302, as indicated at step 504. The component verification engine 100 may receive a designation of the component 116 of the model 114 that is to be verified, such as the Controller subsystem 320, as indicated at step 506. The component verification engine 100 also may receive settings for one or more options for the verification process for the designated component, e.g., through the dialog 400, as indicated at step 508.

The model analyzer 102 may analyze the source model 114 to determine the execution context of the selected component 116, e.g., the controller subsystem 320, as indicated at step 510. In an embodiment, the simulation engine 206 may compile the model 114, and may, but need not, also execute the model 114, as indicated at step 512.

The model compiler 214 may construct a sorted order of the model elements of the source model. For example, model elements may represent multiple equations, which may be represented as methods. Exemplary methods may include Output, which computes an element's outputs given its inputs and its state, Update, which computes an element's state, and Derivative, which computes derivatives of the element's continuous states. The model compiler 214 may determine an order in which to invoke these methods during simulation of the model, and the order may be referred to as the sorted order.

The model analyzer 102 may perform its analysis on one or more of the in-memory representations or IRs generated for the model 114. For example, the model analyzer 102 may evaluate an IR representing a compiled version of the model 114. As noted, the model analyzer 102 also may analyze the model 114 during execution. In addition, the model 114 may be instrumented, and values logged during execution, and the logs may be evaluated by the model analyzer 102 to determine the execution context of the selected component.

The attributes that affect a component's execution behavior will depend on the particular semantics of the modeling environment 200 and on the design of the simulation engine 206. A component's execution context may include attributes of data received and produced by the component. The component's execution context also may include attributes of the component 116 and the source model 114. To the extent the component 116 is included within one or more other components and/or within one or more sub-models, the execution context may include attributes of those other components and/or sub-models.

Data Attributes

Data attributes included in a component's execution context include data type, data complexity, data dimension, frame status, sample time, and sampling mode for example of a component's input and outputs. Exemplary data types include floating point, fixed point, Boolean, integer, alphanumeric character, alphanumeric string, and composite. Data complexity may be real or complex. Data dimensions include scalar, one-dimensional, e.g., vectors, two-dimensional, e.g., matrices, and multi-dimensional, e.g., n-dimension arrays. Frame status includes sample-based where a signal is sampled at a given sample rate, and frame-based where multiple samples are accumulated into frames. As noted above, exemplary sample times include discrete, continuous, fixed in minor step, constant, variable, triggered, and asynchronous. Exemplary sampling modes include sample-based and frame-based.

Model-Level, Component-Level, and Element-Level Attributes

Model-based attributes included in a component's execution context may include the particular solver and solver mode for the model, enabling conditional input branch execution optimization, enabling expression folding and other optimizations, specifying an initial step size, a minimum step size, and a maximum step size for the solver, specifying the fixed step size for fixed step simulation, initialization functions, callback functions, etc. Additional model-level or component-level attributes include global and local variables diagnostic settings, code generation settings, and optimization settings, among others.

The CUT may include or be may included in a conditional component that executes in response to a control signal. Exemplary control signals for conditional components include: an enable control signal, which may cause a respective component to execute when the enable control signal is positive; a triggered control signal which may cause a respective component to execute when a trigger event occurs; and a control flow signal that may cause a respective component to execute under the control of another model element, such as a control block.

Component-level and element-level attributes include variables utilized by the component or element.

In some embodiments, the model analyzer 102 may determine whether the component is part of an algebraic loop present in the source model. An algebraic loop may occur when a signal loop exits in the model with only direct feedthrough model elements in the loop. Direct feedthrough may mean that an element's output depends on the value of an input, and the value of the input directly controls the value of the input, as opposed to a non-direct-feedthrough element in which the element maintains a state variable. Examples of direct feedthrough blocks from the Simulink modeling environment include math function blocks, gain blocks, and product blocks, among others. Examples of non-direct-feedthrough blocks include integrator blocks and unit delay blocks. The simulation engine 206 may include an algebraic loop solver that may be able to solve the algebraic loop.

Upon determining the execution context of the CUT 116, the harness builder 104 may automatically, e.g., programmatically, construct the harness 118, and may configure the harness model 118 so that it provides an execution context for the CUT 116 that is the same as or equivalent to the execution context defined in the source model 114, as indicated at step 514 (FIG. 5B). As a result, when the harness model 118 is executed, the CUT 116' can be expected to have the same or an equivalent execution behavior as in the source model 114.

Figure 6:
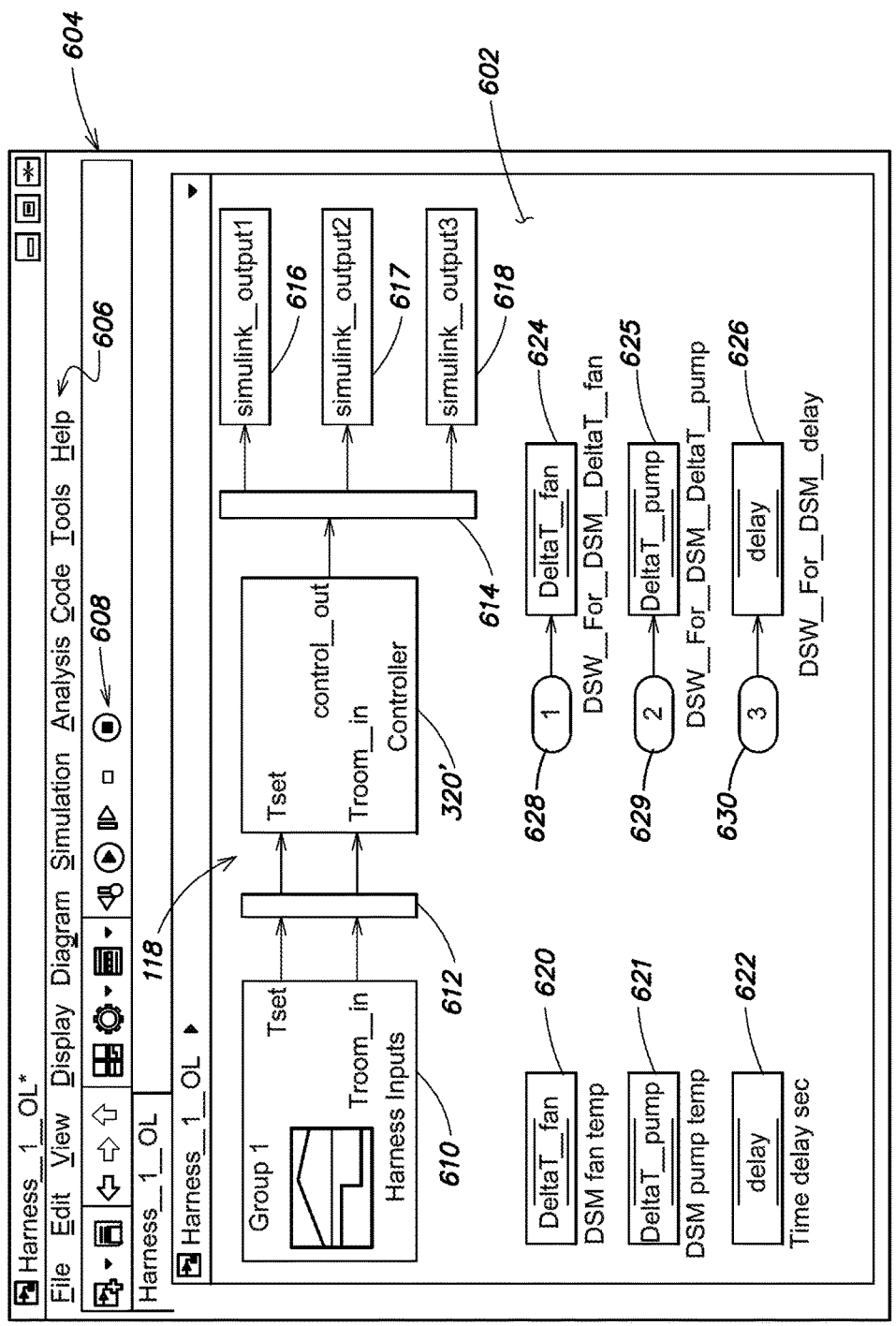
FIG. 6 is a schematic illustration of a harness model in accordance with an embodiment.

FIG. 6 is a schematic illustration of the harness model 118 in accordance with an embodiment. The harness model 118 includes the CUT, i.e., the controller subsystem 320'. The harness model 118 may be presented on a canvas 602 of a new model editor window 604 having a menu bar 606 and a toolbar 608. In addition to the CUT, the harness model 118 further includes a signal builder block 610 as a source block, and an input conversion subsystem 612 that connect to the inputs, i.e., Tset and Troom_in, of the controller subsystem 320'. The signal builder block 610, which is labeled 'Harness Inputs', generates test cases for the CUT under the direction of the test case generator 110. The test cases may be in the form of signals. The harness model 118 also includes an output conversion subsystem 614 and a plurality of sink blocks, namely first, second and third To Workspace blocks 616-618, connected to the control_out output of the controller subsystem 320'. The 'To Workspace' blocks 616-618 may be designed to write their input signals to variables defined in a workspace assigned to the first harness model 600. The names of the variables may be specified inside the To Workspace blocks 616-618, e.g., 'simulink_output1', 'simulink_output2', and 'simulink_output3'.

Because the analysis of the source model 114 revealed that the CUT 116 accesses data store memories, the harness builder 104 may also include a plurality of data store memories in the harness model 118. The data store memories may be included to ensure semantic equivalence. More specifically, the harness model 118 includes first through third data store memory blocks 620-622 whose variable names are 'DeltaT_fan', 'DeltaT_pump', and 'delay'. The harness model 118 further includes first through third data store write blocks 624-626 that write to the 'DeltaT_fan', 'DeltaT_pump', and 'delay' variables. The first through third data store write blocks 624-626 receive signals from first to third inport blocks 628-630.

The test case generator 110 may configure the signal builder block 610 to generate a desired number of signals having desired formats. Exemplary signal formats include step, square, ramp, exponential, pulse, triangular, sawtooth, etc. Alternatively, the data generated by signal builder block 610 may be user-configured.

Figure 7A:
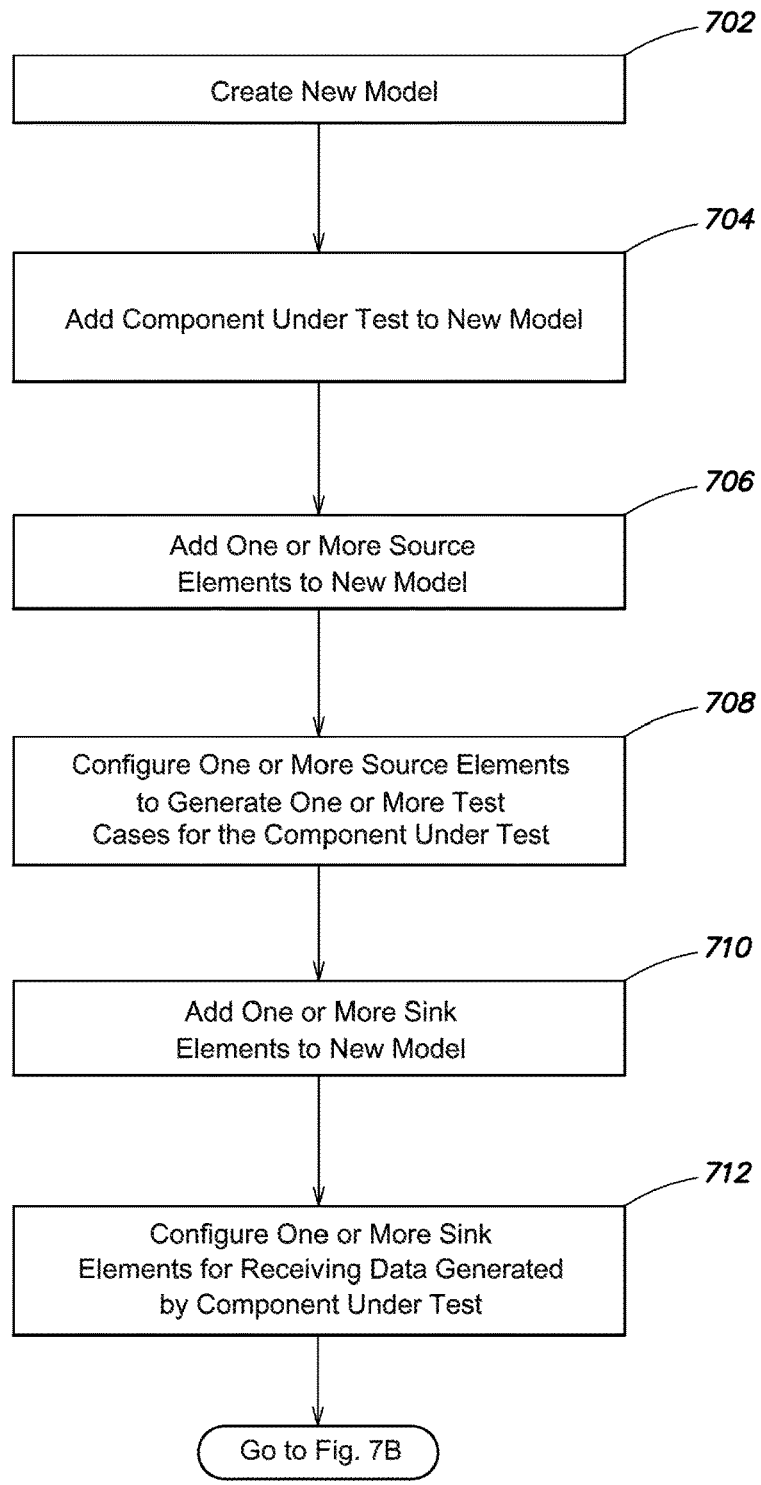
FIGS. 7A-B are partial views of a method in accordance with an embodiment.
Figure 7B:
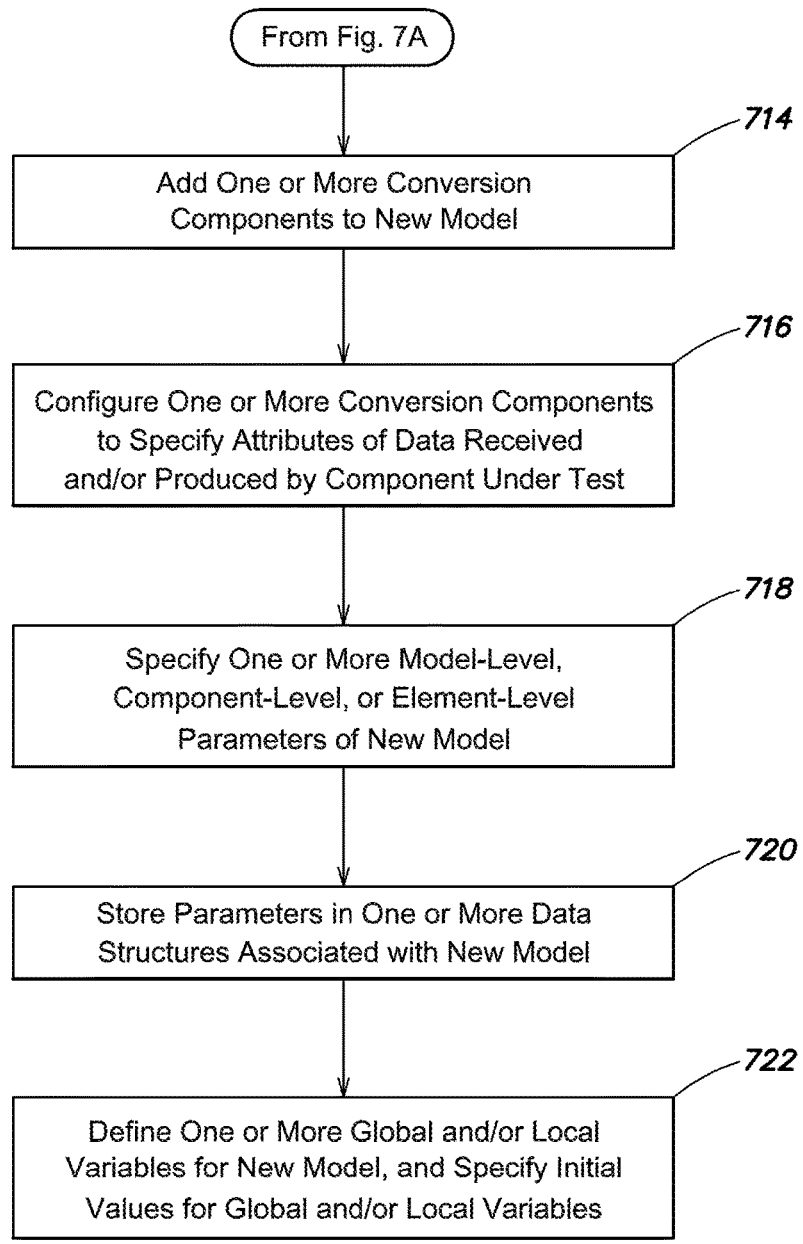

FIGS. 7A-B are partial views of a flow diagram of a method of constructing and configuring a harness model in accordance with an embodiment. The harness builder 104 may create a new model to become the harness model 118, as indicated at step 702. The harness builder 104 may construct an in-memory representation, such as an intermediate representation (IR), of the harness model 118. The harness builder 104 may add the CUT 116' to the new model 118, as indicated at step 704. The CUT 116' added to the harness model 118 may be the same component 116 as present in the source model 114, it may be a clone of the component 116 in the source model 114, or it may refer to the component in the source model. The harness builder 104 may add model elements to the harness model 118. For example, the harness builder 104 may add one or more source elements, such as the Signal Builder block 610, to the harness model 118, as indicated at steps 706. The test case generator 110 may configure the one or more source elements to generate one or more test cases for processing by the CUT 116', as indicated at step 708. The harness builder 104 may add one or more sink element to the harness model 104, such as the To Workspace blocks 616-618, as indicated at step 710. The harness builder 104 may configure the one or more sink elements for receiving output data from the CUT 116', as indicated at step 712. In addition, the harness builder 104 may add one or more conversion components, such as the input and output conversion subsystems 612 and 614, to the harness model 118, as indicated at step 714 (FIG. 7B). The harness builder 104 also may configure the one or more conversion components to set attributes of data received and/or produced by the CUT 116', based on data attributes of the source model 114, as indicated at step 716.

The harness builder 104 may include one or more elements in the harness model 104 to create composite signals for a CUT. For example, the context of a CUT may include one or more composite signals, e.g., that may be received and/or generated by the CUT. A composite signal, which also may be referred to as a bus signal, may be signal composed of other signals. A composite signal may include other composite signals thereby defining a signal hierarchy. A modeling environment may provide one or more bus elements for combining signals into a composite signal and/or for extracting individual signals from a composite signal, such as Bus blocks, Mux blocks, Demux blocks, and Concatenate blocks, among others. The harness builder 104 may include one or more bus elements in a harness model, for example to replicate composite signals sent and/or received by a CUT. In addition, the one or more bus elements may be configured by the harness builder 104 to replicate a signal hierarchy as defined in the source model. In addition, the harness builder 104 may include separate conversion components in the harness model for one or more of the individual signals of a composite signal.

The harness builder 104 also may configure the source and/or sink blocks to be compatible with the CUT. For example, the harness builder 104 may configure a source element to generate a signal or data value whose attributes conform to the attributes determined for the CUT. That is, the harness builder 104 may shape the signals generated by a source element based on the execution context determined for the CUT. The harness builder 104 also may configure a sink element to receive a signal or data value having attributes as specified by the CUT.

The harness builder 104 may specify one or more model-level parameters, component-level parameters, or element-level parameters for the harness model, as indicated at step 718. For example, the harness builder 104 may specify control signals for controlling execution of the CUT and/or one or more components of the CUT. The component verification engine 100 may save the parameters in one or more data structures, such as a configuration set, as indicated at step 720. The harness builder 104 may define and specify values for one or more global and/or local variables for the harness model 118, based on the analysis performed on the source model 114, as indicated at step 722.

Conversion Subsystems

In an embodiment, the harness builder 104 utilizes the input conversion subsystem 612 to ensure that attributes of data received at the CUT 116' are equivalent to the attributes from the source model 114 as determined during the analysis of the source model 114. An input conversion subsystem 612 may be utilized by the harness builder 104 when the source block cannot be configured to output a desired signal. For example, the harness builder 104 may configure the input conversion subsystem 612 to set attributes of the signals sourced by the signal builder block 610, thereby shaping the signals to create an equivalent execution context in the harness model 118. In this way, the execution context defined within the source model 114 is replicated at the harness model 118. In an embodiment, the input conversion subsystem 612 includes one or more attribute setting model elements that condition attributes of the data, such as signals, being provided to the CUT 116' to be equivalent to the data attributes of the source model 114.

Input conversion subsystems may be custom created by the harness builder 104 based on the capabilities and attributes of the source element(s) included of the harness model, and the execution context determined for the CUT. For example, a source element of the harness model may be unable to generate signals or other data values having attributes determined for the CUT. The harness builder 104 may construct an input conversion subsystem to translate the signals or data values generated by the source element to have the data attributes determined for the CUT.

Figure 8:
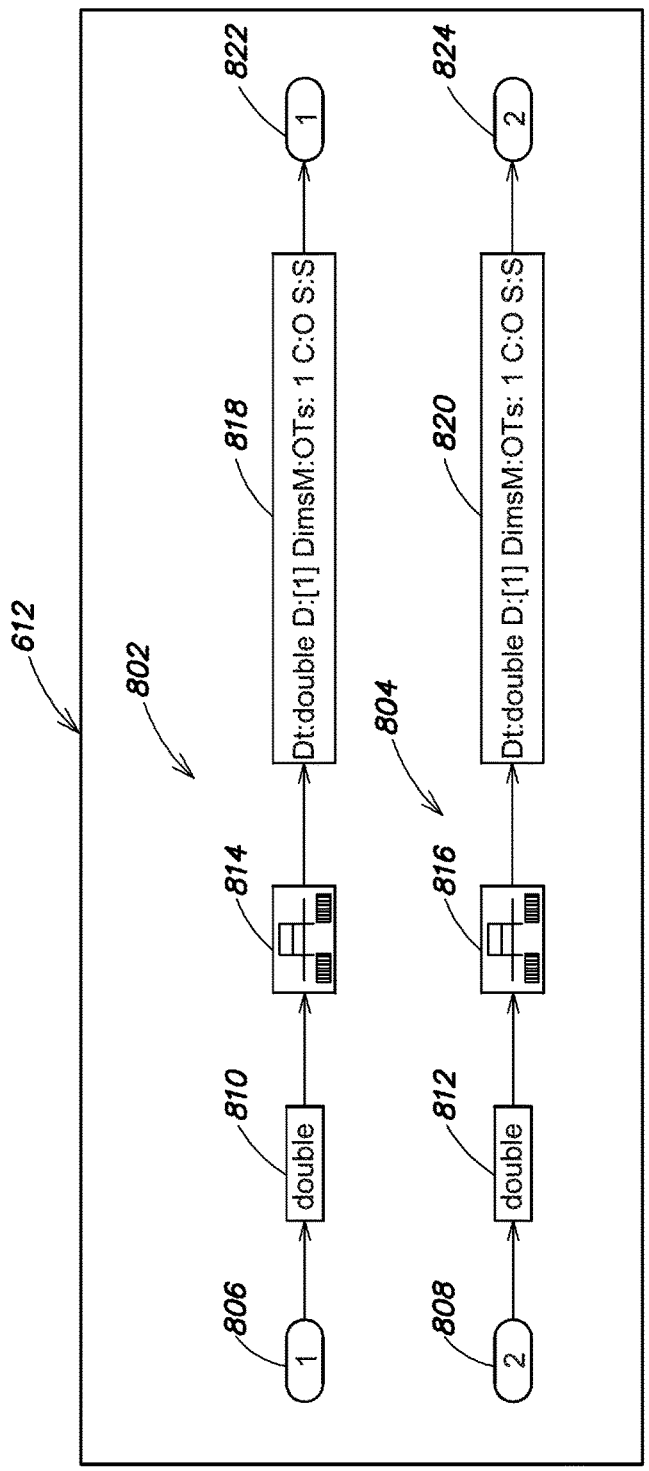
FIG. 8 is a schematic illustration of an input conversion subsystem in accordance with an embodiment.

FIG. 8 is a schematic illustration of the input conversion subsystem 612, which has been expanded to show the model elements forming the input conversion subsystem 612. The input conversion subsystem 612 has two data paths 802 and 804, one for each of the signals being provided to the CUT. Each data path 802 and 804 includes one or more attribute setting elements. Specifically, each path 802 and 804 has an inport block 806 and 808, a data type conversion block 810 and 812, a rate transition block 814 and 816, a signal specification block 818 and 820, and an outport block 822 and 824.

The data type conversion blocks 810 and 812 convert an input signal to a specified data type. Here, the data type conversion blocks 810 and 812 are set by the harness builder 104 to convert the signals generated by the signal builder block 610 to double-precision floating point (double) data types. The rate transition blocks 814 and 816 transfer data from an output of a block operating at a first rate to the input of another block operating at a different rate. The first rate may be faster than the second rate, or it may be slower than the second rate.

The signal specification blocks 818 and 820 may be utilized to enforce the attributes specified for the input data, and may be referred to as attribute enforcement elements. For example, the signal specification blocks may enforce that the data type of the input data is double, the input data has one dimensional values, dimension of the input data is fixed rather than variable sized, the sample time of the input data is 1, the complexity of the input data is real, and the sampling mode of the input data is sample-based.

It should be understood that input conversion subsystems having other structures and functions may be created by the harness builder 104 depending on the source elements included in a harness model and the attributes or parameters determined for the CUT. For example, to the extent a source element produce a signal having a first rate while the CUT is determined to receive a signal of a second rate, the harness builder 104 may include one or more rate transition blocks in an input conversion subsystem to translate the signal from the first rate to the second rate. To the extent a source element produces individual signals while the CUT is determined to receive a bus signal, the harness builder 104 may include one or more bus creator blocks in an input conversion subsystem to compose a bus signal from the individual signals generated by the source element. Furthermore, to the extent a source element produces continuous sample-time signals while a CUT is to receive discrete sample-time signals, the harness builder 104 may include one or more rate transition blocks in an input conversion subsystem to convert continuous sample-time signals produced by a source element to the determined discrete sample-time signals.

Output conversion subsystems also may be custom created by the harness builder 104 based on the execution context determined for the CUT and the capabilities and attributes of the sink element(s) included of the harness model. For example, a sink element of the harness model may be unable to receive signals or other data values computed by the CUT. The harness builder 104 may construct an output conversion subsystem to translate the signals or other data values generated by the CUT to a form that is compatible with the sink element(s) of the harness model.

Figure 9:
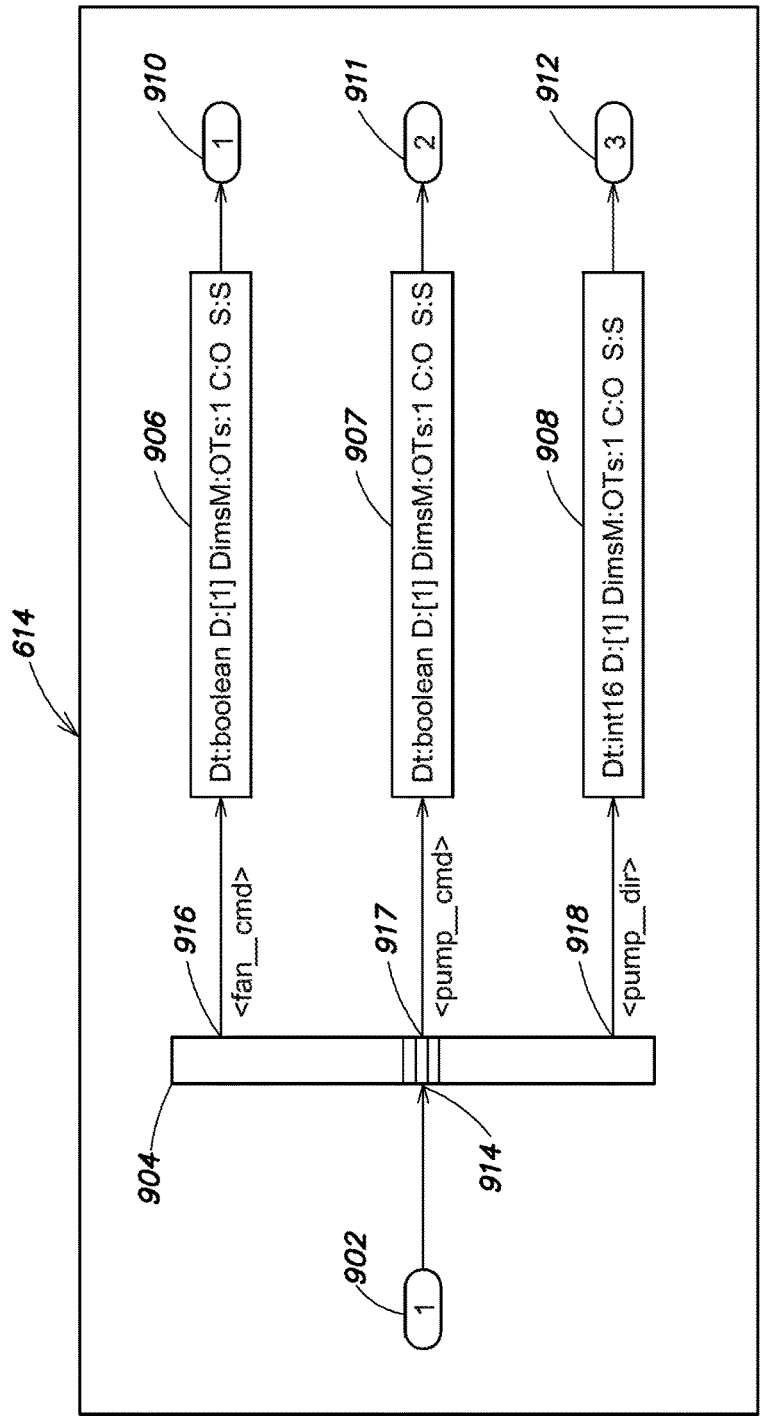
FIG. 9 is a schematic illustration of an output conversions subsystem in accordance with an embodiment.

FIG. 9 is a schematic illustration of the output conversions subsystem 614 expanded to show the model elements forming the output conversions subsystem 614. The output conversion subsystem 614 includes an inport block 902, a bus selector block 904, first through third signal specification blocks 906-908, and first through third outport blocks 910-912.

The bus selector block 904 receives a bus signal and outputs separate signals. The bus selector block 804 has a single input port 914 that receives the bus signal, and three output ports 916-918 that output the separated signals, 'fan_cmd', 'pump_cmd', and 'pump_dir'. The first and second signal specification blocks 906 and 907 may enforce that the data type of the output data is Boolean, the output data has single dimensional values, the dimension of the output data is fixed, the sample time of the output data is 1, the complexity of the output data is real, and the sampling mode is sample-based. The third signal specification block 908 may enforce that the data type of the output data is a 16-bit integer, the output data has single dimensional values, the dimension of the output data is fixed, the sample time of the output data is 1, the complexity of the output data is real, and the sampling mode is sample-based.

It should be understood that output conversion subsystems having other structures and functions may be created by the harness builder 104 depending on the attributes of signals or parameters produced by the CUT and the capabilities of the sink element(s). For example, a CUT may generate mixed data types in a bus signal, and the harness model may include a scope block that can receive individual signals. The harness builder 104 may construct an output conversion subsystem that breaks out the bus signal produced by the CUT into individual signals that may feed respective scope blocks.

In some embodiments, the functions performed by the input or output conversion subsystem may be specified textually rather than graphically or a combination graphically and textually.

The test harness 118 is an example of an open-loop system. The harness builder 104 may also construct a closed-loop harness model. A closed-loop harness model supports reactive testing in which test cases execute or are modified based upon the execution behavior of the CUT. For example, test cases in a closed-loop harness model may be flexibly defined to adapt to or react to the execution behavior of the CUT. Such a test may be defined to feed input 'X' to a CUT, wait for the CUT to produce 'Y', then feed input 'Z' to the CUT if the CUT reaches Y, or else feed input 'A' or take some other action. The test case may leave the time between 'X' and 'Y' undefined. Reactive testing may be employed for CUTs having varying start-up periods during which test cases may be suspended. The second harness model 700 is an example of a closed-loop, reactive testing system.

Figure 10:
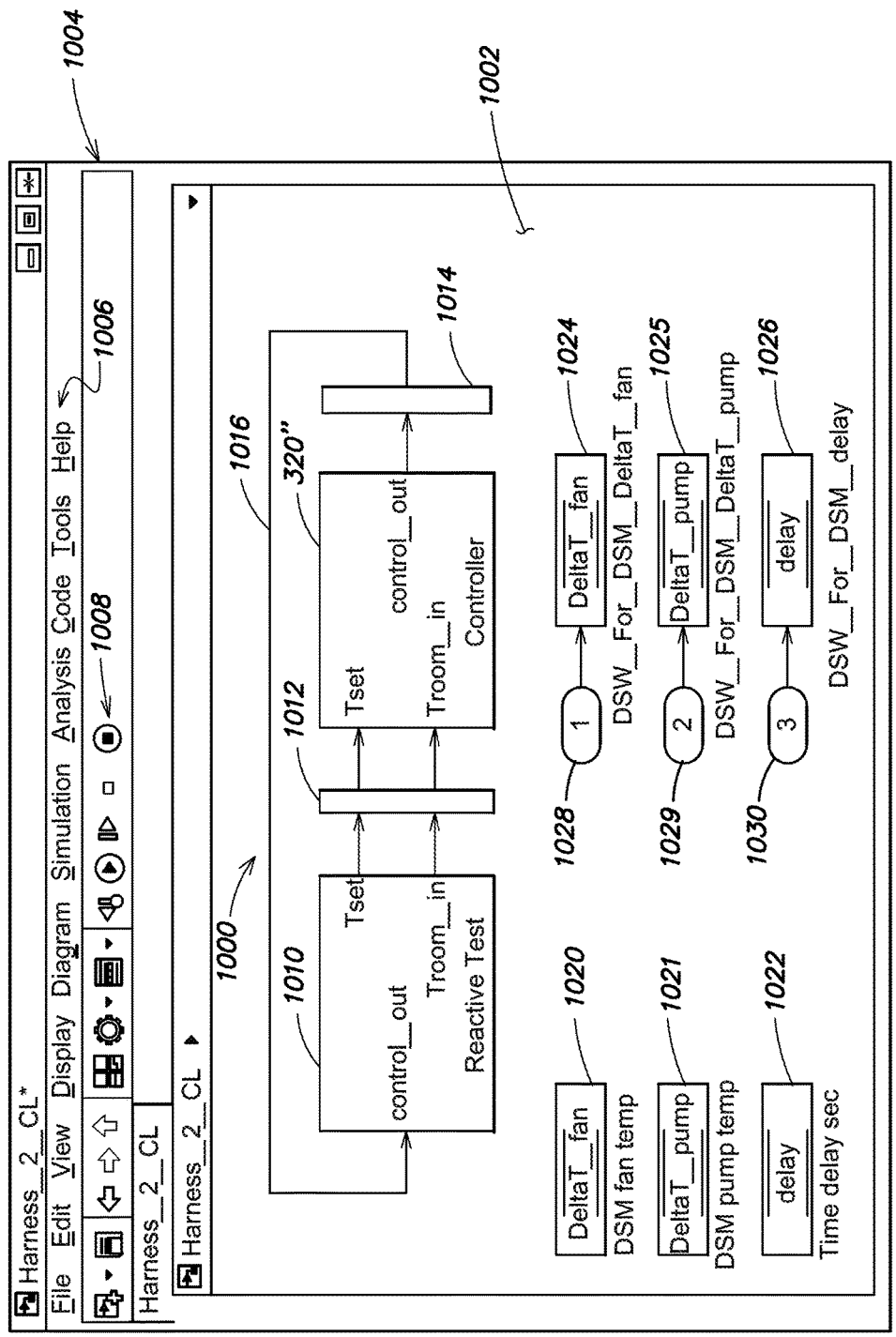
FIG. 10 is a schematic illustration of a second harness model in accordance with an embodiment.

FIG. 10 is a schematic illustration of the second harness model 1000 in accordance with an embodiment. The second harness model 1000 also includes the controller subsystem 320" as the CUT. The second harness model 1000 may be presented on a canvas 1002 of a model editor window 1004 having a menu bar 1006 and a toolbar 1008. The second harness model 1000 further includes a reactive test block 1010 as a source block, and an input conversion subsystem 1012 that connect to the inputs, Tset and Troom_in, of the controller subsystem 320". The reactive test block 1010 is designed to generate test cases for the CUT that depend upon the output of the CUT. Accordingly, the second harness model 1000 also includes a feedback loop 1016 that feeds the output of the CUT 320" back to the reactive test block 1010 via an output conversion subsystem 1014.

The second harness model 1000 also includes first through third data store memory blocks 1020-1022, and first through third data store write blocks 1024-1026 that write to the 'DeltaT_fan', 'DeltaT_pump', and 'delay' variables. The first through third data store write blocks 1024-1026 receive signals from first to third inport blocks 1028-1030.

The simulation engine 206 may execute the harnesses 118 and 1000. During execution, test cases are generated by the source blocks, e.g., the signal builder and the reactive test blocks. The input conversion subsystems 612 and 1012 set the attributes of the test cases to be equivalent to the attributes of the data processed by the controller subsystem 320 in the source model 114. Similarly, model-level parameters, component-level parameters, element-level parameters, and variables of the harness models 118 and 1000 are set in order to recreate, within the harness models 118 and 1000, the execution context of the controller subsystem 320 from the source model 114. As a result, the execution behavior of the controller subsystems 320' and 320" within the harness models 118 and 1000 will be the same or equivalent to that component's execution behavior in the source model 114.

The source model 114 and the harness models 118 and 1000 may each be saved as separate files in a memory. In some embodiments, the source model 114 and the harness models 118 and 1000 may be saved in a single project or other container. In addition, different configuration sets may be saved for the source model 114 and for the harness models 118 and 1000.

The report generator 112 may generate information on the operation of the CUTs 320' and 320" within the harness models 118 and 1000, and this information may be included in the verification report 120. The information may include output values generated by the CUTs 320' and 320" during execution of the harness models 118 and 1000. The report generator 112 may output the verification report 120 by presenting it on a display and/or printing the verification report 120.

A user may evaluate the operation of the CUTs 320' and 320" in the harness models 118 and 1000. For example, the user may review the verification report 120. As a result of this analysis, the user may determine that one or more changes or modifications should be made to the controller subsystem 320. The user may make one or more changes to the controller subsystem 320.

Synchronization

In some embodiments, changes made to the controller subsystem 320 are synchronized among the source model 114 and the harness models 118 and 1000 by the synchronization engine 106. Changes may include adding or removing model elements, such as blocks, states, etc., from the controller subsystem 320.

The synchronization engine 106 may include the same component in both the source model 114 and the harness models 118 and 1000. For example, the in-memory representations of the harness models 118 and 1000 may include a link or pointer in place of the CUTs 320' and 320", and this link or pointer may point to a data structure representing the Controller subsystem 320. This data structure may be part of the in-memory representation of the source model 114.

In addition to synchronizing the representations of the CUT as appearing in the source model 114 and the harness models 118 and 1000, the synchronization engine 106 may also update the harness models 118 and 1000 to conform to changes made to the CUT or to the model 114. For example, suppose the controller subsystem 320 as appearing in the source model 114 is modified to include a new input port. The synchronization engine 106 modifies the controller subsystems 320' and 320" appearing in the harness models 118 and 1000 to include the new input port. Additionally, the synchronization engine 106 modifies the signal builder block 610 of the first harness model 118 and the reactive test block 1010 of the second harness model 1000 to output new signals. The synchronization engine 106 also modifies the input conversion subsystems 612, 1012 with new input and output ports for providing these new output signals of the signal builder block 610 and the reactive test block 1010 to the newly added port of the controller subsystem 320.

In some cases updating a harness model, such as adding and/or removing model elements may not be preferred or desired by a user. Accordingly, in some embodiments, updating a harness model may be subject to user control. For example, the harness model update operation may be performed in response to a user request and/or require user approval or authorization. Automatic harness model updates may be performed where a user configures the synchronization engine 106 to automatically update the harness model following a change the CUT interface.

Model Assessment

A plurality of assessments may be defined for the CUTs 320' and 320" in the harness models 118 and 1000. The assessments may be user-specified or they may be defined programmatically. The assessments may be derived from model requirements. The assessments may originally have been defined within the model 114, and may be copied over to the test harnesses 118 and 1000. Alternatively or additionally, assessments may be defined within the harness models 118 and 1000. Assessments may be defined by adding one or more model elements designed to assess generated data to the harness models 118 and 1000. Exemplary elements include an assertion block that checks whether a received input signal is zero, a check static range block that checks whether a received input signal falls within a specified range, a check static lower bound block that checks whether a received input signal is greater than a specified lower bound, and a check static upper bound block that checks whether a received input signal is less than a specified upper bound. In some embodiments, selected ones of these assessments may be activated for a given simulation of the harness models 118 and 1000.

The assessment engine 108 may analyze the harness models 118 and 1000, and determine what assessments are included in the harness models 118 and 1000. The assessment engine 108 may cause a graphical affordance to be presented on a display that presents the assessments identified in the harness models 118 and 1000. A user may operate the graphical affordance to activate desired assessments and to deactivate undesired assessments.

Figure 11:
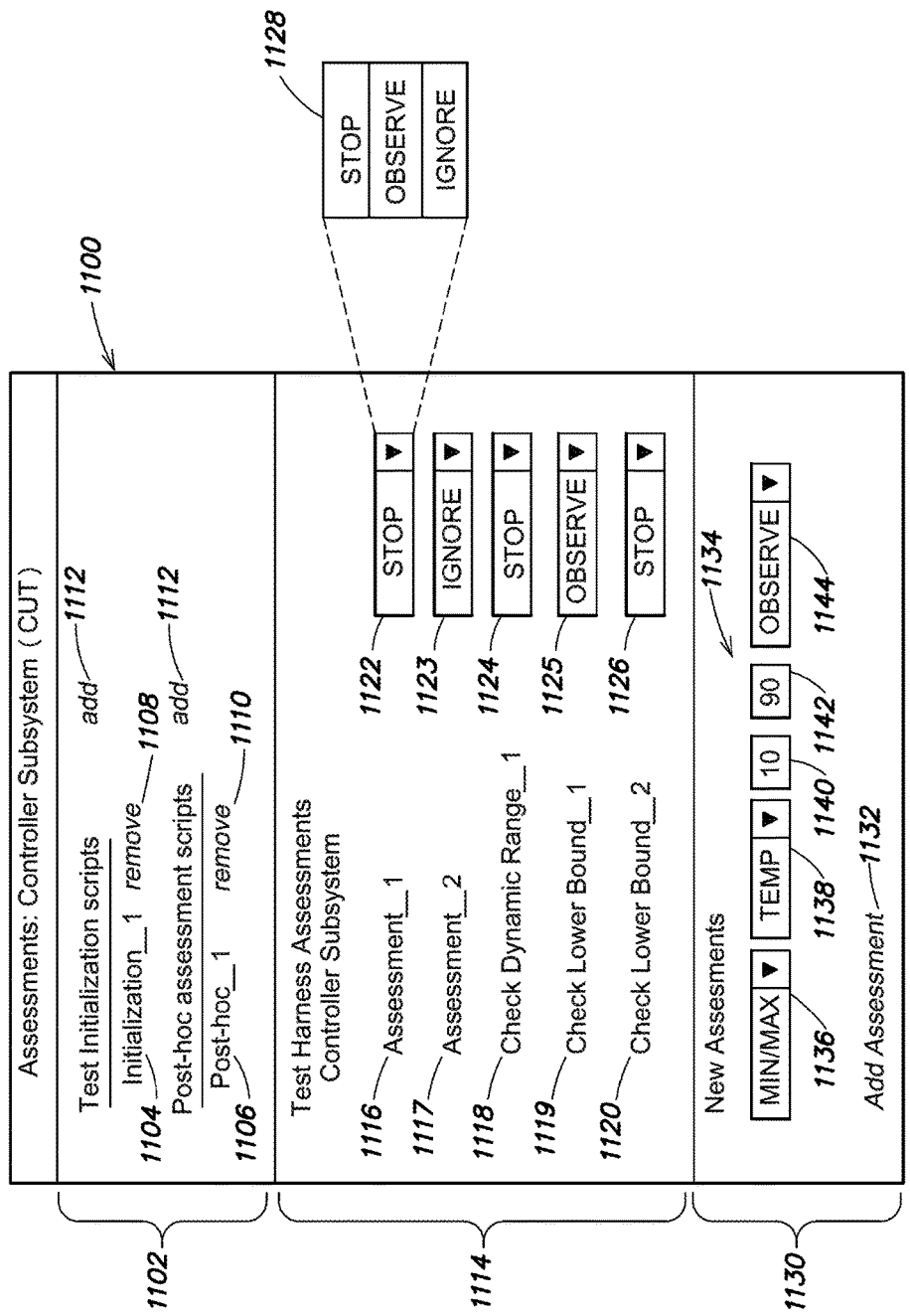
FIG. 11 is a schematic illustration of a graphical affordance in accordance with an embodiment.

FIG. 11 is a schematic illustration of a graphical affordance in the form of a dialog 1100 in accordance with an embodiment. The dialog 1100 may include a first section 1102 that lists one or more initialization and post-hoc test scripts for the harness model. For example, the first section 1102 may list an initialization_1 test script as indicted at entry 1104, and a post-hoc_1 script as indicated at entry 1106. Remove command buttons 1108 and 1110 may be provided for each script 1104 and 1106 allowing the user to choose to remove the respective script from the next run of the harness model. In addition, add command buttons 1112 and 1114 may be provided for adding new initialization and post-hoc assessment scripts.

A second section 1114 of the dialog 1100 may list the assessments identified for the CUT. An entry may be provided for each assessment, such as entries 1116-1120. Drop down command buttons 1122-1126 may be provided for each entry 1116-1120. The drop down command buttons 1122-1126 may provide a choice among several available options for the respective assessment, such as Stop, Observe, and Ignore, as indicated at 1128. If the Stop command is selected, then execution of the harness model is stopped if the respective assessment occurs. If the Observe command is selected, then the result of the respective assessment is logged, but execution continues. If the Ignore command is selected, then the respective assessment is ignored, and not even logged.

A third section 1130 of the dialog 1100 may allow new assessments to be defined. An 'Add Assessment' command 1032 may be provided allowing the user to specify a new assessment to be evaluated when the harness model is run. When the 'Add Assessment' command 1132 is selected, a series of widgets, such as drop down commands, text entry boxes, etc., may be presented for specifying the features of the new assessment. For example, an entry 1134 for a new assessment may include an assessment type drop down menu 1136, a variable or parameter name drop down menu 1138, one or more threshold data entry boxes 1140 and 1142, and a mode drop down menu 1144. The widgets of the entry 1134 have been set to specify a minimum/maximum (min/max) type of assessment for the temperature (temp) variable, where the minimum value is 10, the maximum value is 90, and the assessment is to be logged.

Figure 12:
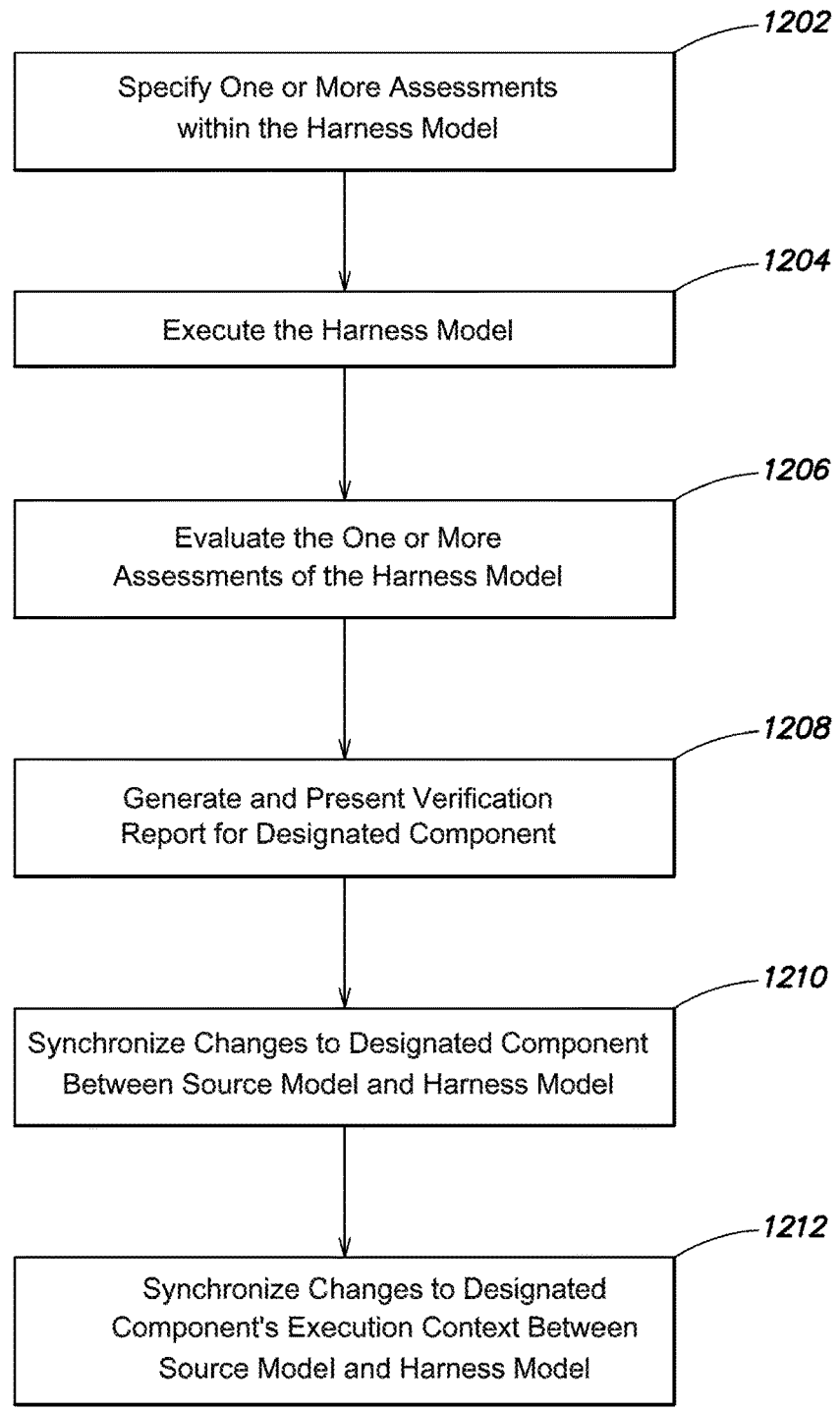
FIG. 12 is a schematic illustration of a data processing device in accordance with an embodiment.

FIG. 12 is a flow diagram of a method in accordance with an embodiment. One or more assessments may be specified for the harness model 118, as indicated at step 1202. The harness model 118 may be executed, as indicated at step 1204, and the assessments may be evaluated, as indicated at step 1206. The report generator 112 may generate the report 120 regarding the execution of the harness model 118, and the report 120 may be presented to a user, as indicated at step 1208. Changes may be made to the CUT 320 at the source model 114 or to the CUTs 320' and 320" at the harness models 118 and 1000 may be synchronized, as indicated at step 1210. Changes to the execution context of the CUT 320 may be made at the source model 114 or to the CUTs 320' and 320" at the harness models 118 and 1000, and the changes to the execution context may be synchronized, as indicated at step 1212.

Model Execution

In some embodiments, model execution may be carried out for one or more model inputs, such as a set of model inputs, and may produce one or more model results or outputs, such as a set of model outputs. Model execution may take place over a time-span. For example, execution may begin at a start time, include one or more time steps, and end at a stop time. The start time, time steps, and end time may be logical and have no correspondence with the physical passage of time. Alternatively, the start time, time steps, and end time may have a correspondence with the physical passage of time and execution may operate in real time. The selection of the time steps may be determined by the selected solver 216.

Model elements may produce outputs and, if appropriate, update their internal states at particular sample times. The sample times may be port-based or block-based. For block-based sample times, all of the inputs and outputs of the block may run at the same rate. For port-based sample times, the input and output ports of the block can run at different rates. Sample times also may be discrete, continuous, or inherited. Discrete sample times are fixed time increments that may be determined before execution of the model. Continuous sample times may be divided into major time steps and minor time steps, where the minor steps may represent subdivisions of the major steps. The solver used to execute the model may determine the times of the minor steps, and may use results computed at minor time steps to improve the accuracy of the results computed at major time steps. Nonetheless, block outputs may only appear at the major time steps. For an inherited sample time, the solver may determine a best sample time for the respective element, e.g., block, based on the block's execution context within the model. This determination may be performed during the model compilation stage. It should be understood that other sample times may be used or defined, such as the fixed in minor step, constant, variable, triggered, and asynchronous sample times as provided by the Simulink® model-based design environment.

Model execution may involve a plurality of stages or phases, such as a compile stage, a link stage, and a simulation loop stage. The compile and link stages may be performed by the model compiler 214 of the simulation engine 206. The compile stage may involve preparing data structures and evaluating parameters of the model 114 to determine their values, determining connectivity among components, such as blocks, subsystems, states, submodels, etc. of the model 114, configuring and propagating block characteristics (e.g., sample times, data dimensions, data types, etc.), checking signal compatibility, flattening the model's hierarchy, performing optimizations, such as block reduction and block insertion, and determining a sorted order of the blocks or the equations corresponding to the blocks of the model 114. The simulation engine 206 may also establish other execution schedules, such as state-based, event-based, and/or message-based execution schedules.

The in-memory representation of the model may be in the form of an Intermediate Representation (IR) that may include a plurality of nodes that represent model elements, e.g., blocks, subsystems, states, etc., of the model. The IR also may include edges that represent signals, events, state transitions, physical relationships, or other connections or dependencies, among the elements of the model. Nodes of an IR may be implemented through data structures stored in a memory, while edges may be implemented through pointers. During the compile and/or link phases, the in-memory representation or IR may be modified, e.g., optimized, by the IR builder 218. The initial and optimized IRs may be implemented as graphs, such as a data, control, call or data/control/call flow graphs, that include a plurality of nodes and edges. The nodes of the IR may represent the blocks and other components or objects of the model, and the edges may represent connections, such as signals, state transitions, messages, and events, defined within the model. Special nodes, called network instance components (NICs), may be used to provide hierarchy in the IR by abstractly representing subsystems or other virtual blocks of the model. The IR may include a plurality of hierarchically arranged levels. For example, there may be a top-level of IR and one or more of the components of the top-level IR may be a particular type or form of in-memory representation. For example, one or more components of the IR may be a Control Flow Graph (CFG), a Data Flow Graph (DFG), a Control Data Flow Graph (CDFG), a program structure tree (PST), an abstract syntax tree (AST), a netlist, etc. A CDFG may capture the control flow as well as the data flow of the model through data dependency and control dependency edges. The model compiler 214 may apply one or more optimization techniques to an IR resulting in the creation of additional IRs. The in-memory representations or IRs may be stored in memory, such as main memory, of a data processing device, and may include nodes that represent the objects, e.g., blocks, of the model, and edges that represent signals, events, state transitions, physical relationships, or other dependencies.

During the configuration and inferring of block and port/signal characteristics, compiled attributes, such as dimensions, data types, complexity, sample time, etc., of the blocks (and/or ports) may be setup on the basis of the corresponding behaviors and the attributes of blocks (and/or ports) that are interconnected, e.g., through graphical affordances, such as arrows, lines, etc., or textually. For example, the attribute setup may be performed through a propagation process, during which block behaviors are propagated through" the model 114 from one block or component to the next following signal, data, control, state transition, mechanical, electrical, or other connectivity or dependency.

For a model element whose behavior has been explicitly specified, propagation may ensure that the block's attributes are compatible with the attributes of the blocks connected to it. If not, an error or warning may be issued. Secondly, blocks may be defined to be compatible with a wide range of attributes. Such blocks may adapt their behavior based on the attributes of the blocks connected to them. The exact implementation of the block may thus be determined on the basis of the structure of the model in which the block is located. To the extent the model 114 includes blocks or components configured to operate at different sample rates, the compilation phase may include validating that all rate-transitions yield deterministic results, and that the appropriate rate transition blocks are present in the model 114. The compilation stage also may determine block connectivity. For example, virtual blocks, such as subsystem blocks, may be optimized away, e.g., removed, and the remaining non-virtual blocks may be reconnected to each other appropriately. The manner in which model elements are interconnected may not define the order in which the equations or methods corresponding to the elements will be solved, e.g., executed. The actual order may be determined by the selected solver 216 during the sorting step of the compilation stage. In an embodiment, the sorted order, once determined, may be fixed for the entire duration of the model's execution, e.g., for the entire simulation time of the model.

In the link phase, memory may be allocated for signals, states, and run-time parameters defined within the model, and function and/or method execution lists may be created from the block sorted order.

Returning to FIG. 4, if the third checkbox 416 is checked, then the harness builder 104 may construct a harness model without compiling the source model 114. A user may select this option when the source model 114 is not yet sufficiently completed to permit compilation. Nevertheless, a harness model including the CUT can still be automatically created by the harness builder 104. In this example, the harness model may include input and output conversion subsystems, but the parameters of those subsystems may be not be specified, since the source model was not compiled, and the attributes of the CUT from the model 114 were not automatically determined.

If SIL mode is selected, the CUT may be represented in the harness model as a SIL block. In PIL mode, the code generator 208 may generate code for the CUT, such as C or C++ source code, and the compiler 210 may compile the generated source code into object code. The object code may be a separate software module. The harness model may be executed, and the execution of the harness model may trigger execution of the separate software module. The harness model and the software module may be executed by the same or different processors. For example, input values generated during execution of the harness model may be provided to the software module, and output values generated by the software module may be returned to the execution of the harness model. For example, the simulation engine 206 may interact with the remote processor via an external communication channel. The simulation engine 206 may send input, trigger execution, and receive output from the remote processor.

Illustrative Data Processing System

Figure 13:
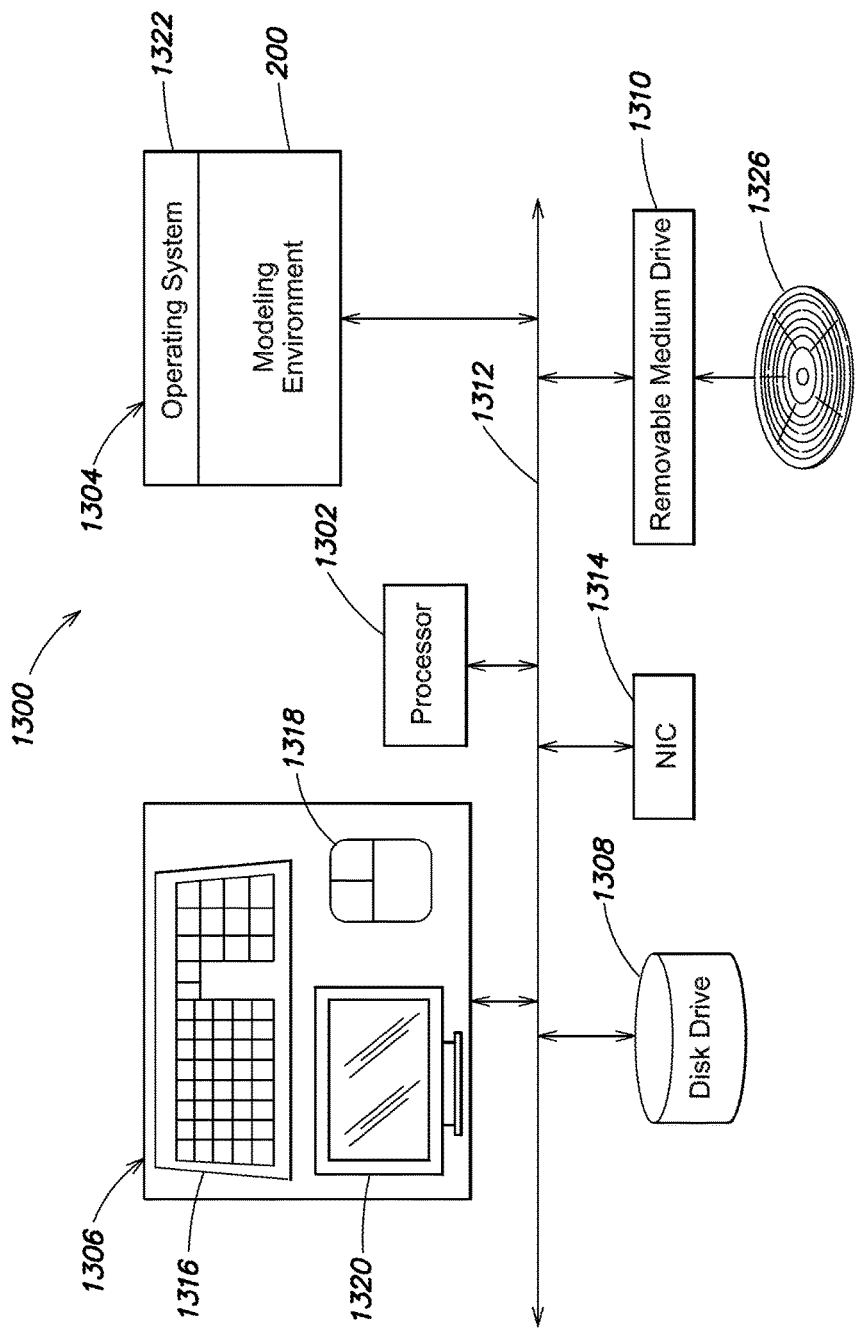
FIG. 13 is a schematic illustration of a computer or data processing system in accordance with an embodiment.

FIG. 13 is a schematic illustration of a computer or data processing system 1300 for implementing an embodiment of the invention. The computer system 1300 may include one or more processing elements, such as a processor 1302, a main memory 1304, user input/output (I/O) 1306, a persistent data storage unit, such as a disk drive 1308, and a removable medium drive 1310 that are interconnected by a system bus 1312. The computer system 1300 may also include a communication unit, such as a network interface card (NIC) 1314. The user I/O 1306 may include a keyboard 1316, a pointing device, such as a mouse 1318, and a display 1320. Other user I/O 1306 components include voice or speech command systems, touchpads and touchscreens, printers, projectors, etc. Exemplary processors include single or multi-core Central Processing Units (CPUs), Graphics Processing Units (GPUs), Field Programmable Gate Arrays (FPGAs), Application Specific Integrated Circuits (ASICs), microprocessors, microcontrollers, etc.

The main memory 1304, which may be a Random Access Memory (RAM), may store a plurality of program libraries or modules, such as an operating system 1322, and one or more application programs that interface to the operating system 1322, such as the modeling environment 200.

The removable medium drive 1310 may accept and read a computer readable medium 1326, such as a CD, DVD, floppy disk, solid state drive, tape, flash memory or other non-transitory medium. The removable medium drive 1310 may also write to the computer readable medium 1326.

Suitable computer systems include personal computers (PCs), workstations, servers, laptops, tablets, palm computers, smart phones, electronic readers, and other portable computing devices, etc. Nonetheless, those skilled in the art will understand that the computer system 1300 of FIG. 13 is intended for illustrative purposes only, and that the present invention may be used with other computer, data processing, or computational systems or devices. The present invention may also be used in a computer network, e.g., client-server, architecture, or a public and/or private cloud computing arrangement. For example, the modeling environment 200 may be hosted on one or more cloud servers or devices, and accessed by remote clients through a web portal or an application hosting system, such as the Remote Desktop Connection tool from Microsoft Corp.

Suitable operating systems 1322 include the Windows series of operating systems from Microsoft Corp. of Redmond, Wash., the Android and Chrome OS operating systems from Google Inc. of Mountain View, Calif., the Linux operating system, the MAC OS® series of operating systems from Apple Inc. of Cupertino, Calif., and the UNIX® series of operating systems, among others. The operating system 1322 may provide services or functions for applications or modules, such as allocating memory, organizing data objects or files according to a file system, prioritizing requests, managing I/O, etc. The operating system 1322 may run on a virtual machine, which may be provided by the data processing system 1300.

As indicated above, a user, such as an engineer, scientist, programmer, developer, etc., may utilize one or more input devices, such as the keyboard 1316, the mouse 1318, and the display 1320 to operate the modeling environment 200, and construct one or more models. As discussed, the models may be computational and may have executable semantics. In particular, the models may be simulated or run. In particular, the models may provide one or more of time-based, event-based, state-based, message-based, frequency-based, control-flow based, and dataflow-based execution semantics. The execution of a model may simulate operation of the system that is being designed or evaluated. The term graphical model is intended to include graphical program.

The foregoing description of embodiments is intended to provide illustration and description, but is not intended to be exhaustive or to limit the disclosure to the precise form disclosed. Modifications and variations are possible in light of the above teachings or may be acquired from a practice of the disclosure. For example, while a series of acts has been described above with respect to the flow diagrams, the order of the acts may be modified in other implementations. In addition, the acts, operations, and steps may be performed by additional or other modules or entities, which may be combined or separated to form other modules or entities. Further, non-dependent acts may be performed in parallel. Also, the term "user", as used herein, is intended to be broadly interpreted to include, for example, a computer or data processing system or a human user of a computer or data processing system, unless otherwise stated.

Further, certain embodiments of the disclosure may be implemented as logic that performs one or more functions. This logic may be hardware-based, software-based, or a combination of hardware-based and software-based. Some or all of the logic may be stored in one or more tangible non-transitory computer-readable storage media and may include computer-executable instructions that may be executed by a computer or data processing system, such as system 1300. The computer-executable instructions may include instructions that implement one or more embodiments of the disclosure. The tangible non-transitory computer-readable storage media may be volatile or non-volatile and may include, for example, flash memories, dynamic memories, removable disks, and non-removable disks.

No element, act, or instruction used herein should be construed as critical or essential to the disclosure unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The foregoing description has been directed to specific embodiments of the present disclosure. It will be apparent, however, that other variations and modifications may be made to the described embodiments, with the attainment of some or all of their advantages. For example, the harness builder 124 may automatically construct a harness model for other model elements in addition to a component. In particular, the harness builder 126 may construct a harness model for an entire model, a single model element, a user-selected group of model elements, a sub-model, a LabVIEW virtual instrument, a LabVIEW sub-Virtual Instrument (subVI), a MatrixX SuperBlock, etc. Therefore, it is the object of the appended claims to cover all such variations and modifications as come within the true spirit and scope of the disclosure.

What is claimed is:

1. A method comprising:
    receiving a selection of a component included within an executable source model, the selected component having an execution context as defined within the executable source model, wherein the execution context is associated with a behavior of the selected component in the executable source model;
    analyzing the executable source model to determine the execution context of the selected component;
    constructing automatically, by a processor, an executable harness model that includes the selected component or a copy of the selected component, the executable harness model separate from the executable source model and constructed according to one or more syntax rules of a modeling environment;
    including in the executable harness model a plurality of model elements;
    configuring the plurality of model elements to provide the selected component or the copy of the selected component, within the executable harness model, with a harness model execution context that replicates the execution context of the selected component as defined within the executable source model and associated with the behavior of the selected component in the executable source model, wherein the configuring the plurality of model elements includes connecting the selected component or the copy of the selected component to at least one model element of the plurality of model elements according to the one or more syntax rules; and
    executing the executable harness model including the selected component or the copy of the selected component.

2. The method of claim 1 wherein
    the execution context of the selected component as defined within the executable source model includes a plurality of attributes,
    at least some of the plurality of model elements have properties, and
    the configuring includes setting the properties of the at least some of the plurality of model elements based on the plurality of attributes of the selected component.

3. The method of claim 2 wherein the plurality of attributes include one or more of
    an input or output data type of the selected component,
    an input or output data dimension of the selected component,
    an input or output data complexity of the selected component,
    a control signal of a conditionally executed component,
    a workspace variable,
    a parameter,
    a type of sample time of the selected component,
    a sample time of the selected component,
    a solver type,
    a shared memory, or
    a component-level parameter.

4. The method of claim 1 wherein at least one of the plurality of model elements included in the executable harness model is a data specification block, the method further comprising:
    configuring the data specification block to specify at least one of
        a data type for a first input of the selected component or the copy of the selected component,
        a data dimension for the first or a second input of the selected component or the copy of the selected component,
        a data complexity for the first, second, or a third input of the selected component or the copy of the selected component,
        a type of sample time,
        a sample time, or
        a sampling mode.

5. The method of claim 1 wherein at least one of the plurality of model elements included in the executable harness model is a bus element that defines a composite signal for the selected component or the copy of the selected component where the composite signal has a plurality of hierarchically arranged individual signals.

6. The method of claim 1 wherein the selected component or the copy of the selected component included in the executable harness model is the same component as included in the executable source model.

7. The method of claim 1 further comprising:
receiving, within the executable source model, a change to the selected component; and
synchronizing the change to the selected component or the copy of the selected component included in the executable harness model.

8. The method of claim 7 further comprising:
detecting, by the processor, the change to the selected component, wherein the synchronizing the change to the selected component or the copy of the selected component is performed automatically by the processor.

9. The method of claim 1 further comprising:
receiving, within the executable source model, a change to the execution context of the selected component; and
modifying the executable harness model to conform to the change to the execution context of the selected component.

10. The method of claim 9 further comprising:
detecting, by the processor, the change to the execution context of the selected component, wherein the modifying the executable harness model is performed automatically by the processor.

11. The method of claim 1 wherein the executable source model includes model workspace data, the method further comprising:
adding harness workspace data to the executable harness model where the harness workspace data conforms to the model workspace data; and
automatically modifying the harness workspace data in response to a change to the model workspace data.

12. The method of claim 1 wherein the selected component or the copy of the selected component included in the executable harness model references the executable source model.

13. The method of claim 1 further comprising:
including a plurality of verification elements in the executable harness model; and
configuring the plurality of verification elements to make assessments of the selected component or the copy of the selected component included in the executable harness model.

14. The method of claim 13 wherein at least some of the assessments are specified in the executable source model.

15. The method of claim 13 wherein the executing the executable harness model generates verification results based on the assessments, the method further comprising:
presenting, on an output device, the generated verification results.

16. The method of claim 15 wherein the output device is a display.

17. The method of claim 15 wherein the generated verification results include an overall pass/fail indication for the selected component or the copy of the selected component.

18. One or more non-transitory computer-readable media including program instructions executable by a processor, the program instructions comprising program instructions to:
receive a selection of a component included within an executable source model, the selected component having an execution context as defined within the executable source model, wherein the execution context is associated with a behavior of the selected component in the executable source model;
determine the execution context of the selected component;
construct automatically, by the processor, an executable harness model according to one or more syntax rules of a modeling environment and that
is separate from the executable source model,
includes the selected component or a clone of the selected component, and
includes a plurality of model elements;
configure the plurality of model elements to define a harness execution context, of the selected component or the clone of the selected component within the executable harness model, that is equivalent to the execution context as defined within the executable source model and associated with the behavior of the selected component in the executable source model, wherein the configure the plurality of model elements includes connecting the selected component or the clone of the selected component to at least one model element of the plurality of model elements according to the one or more syntax rules; and
execute the executable harness model including the selected component or the clone of the selected component.

19. The one or more non-transitory computer-readable media of claim 18 wherein the plurality of model elements includes a source element and an input conversion subsystem, the program instructions to configure the plurality of model elements includes instructions to:
configure the executable source element to produce an input signal for the selected component; and
configure the input conversion subsystem to translate one or more attributes of the input signal based on the execution context of the selected component as defined within the executable source model.

20. The one or more non-transitory computer-readable media of claim 18 wherein the plurality of model elements includes a sink element and an output conversion subsystem, the program instructions to configure the plurality of model elements includes instructions to:
configure the sink element to receive an output signal from the selected component; and
configure the output conversion subsystem to translate one or more attributes of the output signal based on one or more properties of the sink element.

21. The one or more non-transitory computer-readable media of claim 18 further comprising program instructions to:
synchronize changes to the selected component among the executable source model and the executable harness model.

22. The one or more non-transitory computer-readable media of claim 18 wherein at least one of the plurality of model elements included in the executable harness model is a data specification block, the program instructions further comprising program instructions to:
configure the data specification block to specify at least one of
a data type for a first input of the selected component or the clone of the selected component,
a data dimension for the first or a second input of the selected component or the clone of the selected component, a data complexity for the first, second, or a third input of the selected component or the clone of the selected component,
a type of sample time,
a sample time, or
a sampling mode.

23. The one or more non-transitory computer-readable media of claim 18 wherein the executable source model includes model workspace data, the program instructions further comprising program instructions to:
add harness workspace data to the executable harness model where the harness workspace data conforms to the model workspace data; and
automatically modify the harness workspace data in response to a change to the model workspace data.

24. An apparatus comprising:
a processor configured to:
analyze an executable source model to determine an execution context of a component as defined within the executable source model, wherein the execution context is associated with a behavior of the component in the executable source model;
construct automatically an executable harness model, the executable harness model
according to one or more syntax rules of a modeling environment,
including the component or a copy of the component, being separate from the executable source model, and having a plurality of model elements;
configure one or more of the plurality of model elements to create, within the executable harness model, a harness model execution context for the component or the copy of the component that is equivalent to the execution context of the component as defined within the executable source model and associated with the behavior of the component in the executable source model, wherein the configure the one or more of the plurality of model elements includes connecting the component or the copy of the component to at least one model element of the plurality of model elements according to the one or more syntax rules; and
execute the executable harness model including the component or the copy of the component.

25. The apparatus of claim 24 where the executable source model has executable semantics.

26. The apparatus of claim 24 where the component is a subsystem, a chart, a subchart, or a sub-model.

27. The one or more non-transitory computer-readable media of claim 18 wherein
the execution context of the selected component as defined within the executable source model includes a plurality of attributes,
at least some of the plurality of model elements have properties, and
the program instructions to configure include program instructions to set the properties of the at least some of the plurality of model elements based on the plurality of attributes of the selected component.

28. The one or more non-transitory computer-readable media of claim 27 wherein the plurality of attributes include one or more of
an input or output data type of the selected component,
an input or output data dimension of the selected component,
an input or output data complexity of the selected component,
a control signal of a conditionally executed component,
a workspace variable,
a parameter,
a type of sample time of the selected component,
a sample time of the selected component,
a solver type,
a shared memory, or
a component-level parameter.

29. The apparatus of claim 24 wherein
the execution context of the component as defined within the executable source model includes a plurality of attributes,
at least some of the plurality of model elements have properties, and
the configure further includes setting the properties of the at least some of the plurality of model elements based on the plurality of attributes of the component.

30. The apparatus of claim 29 wherein the plurality of attributes include one or more of
an input or output data type of the component,
an input or output data dimension of the component,
an input or output data complexity of the component,
a control signal of a conditionally executed component,
a workspace variable,
a parameter,
a type of sample time of the component,
a sample time of the component,
a solver type,
a shared memory, or
a component-level parameter.

31. The apparatus of claim 24 wherein at least one of the plurality of model elements included in the executable harness model is a data specification block, the processor further configured to:
configure the data specification block to specify at least one of
a data type for a first input of the component or the copy of the component,
a data dimension for the first or a second input of the component or the copy of the component,
a data complexity for the first, second, or a third input of the component or the copy of the component,
a type of sample time,
a sample time, or
a sampling mode.

32. The apparatus of claim 24, wherein the processor is further configured to:
receive, within the executable source model, a change to the component; and
synchronize the change to the component or the copy of the component included in the executable harness model.

33. The apparatus of claim 24, wherein the is processor further configured to:
receive, within the executable source model, a change to the execution context of the component; and
modify the executable harness model to conform to the change to the execution context of the component.

34. The apparatus of claim 24, wherein the executable source model includes model workspace data, the processor further configured to:
add harness workspace data to the executable harness model where the harness workspace data conforms to the model workspace data; and
automatically modify the harness workspace data in response to a change to the model workspace data.

* * * * *